United States Patent
Kashiwagi et al.

(10) Patent No.: US 8,077,342 B2
(45) Date of Patent: Dec. 13, 2011

(54) IMAGE PROCESSING APPARATUS, METHOD OF CONTROLLING IMAGE PROCESSING APPARATUS, PROGRAM, AND STORAGE MEDIUM

(75) Inventors: Masaki Kashiwagi, Hiratsuka (JP); Hiroyuki Tsuji, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1140 days.

(21) Appl. No.: 11/778,370

(22) Filed: Jul. 16, 2007

(65) Prior Publication Data
US 2008/0025637 A1 Jan. 31, 2008

(30) Foreign Application Priority Data
Jul. 26, 2006 (JP) .................... 2006-203373

(51) Int. Cl.
G06K 15/00 (2006.01)
G06K 9/20 (2006.01)
G06K 9/60 (2006.01)

(52) U.S. Cl. .......... 358/1.18; 382/282; 382/306

(58) Field of Classification Search .......... 382/159, 382/282; 358/1.18
See application file for complete search history.

(56) References Cited

U.S. PATENT DOCUMENTS

| | | | |
|---|---|---|---|
| 7,072,506 B1 | 7/2006 | Hirota | |
| 7,125,114 B2 * | 10/2006 | Tsujimoto | 347/105 |
| 7,177,462 B2 | 2/2007 | Hirota | |
| 7,319,786 B2 | 1/2008 | Hirota | |
| 7,336,394 B2 * | 2/2008 | Tsujimoto | 358/1.9 |
| 7,372,594 B1 | 5/2008 | Kusakabe | |
| 7,697,162 B2 * | 4/2010 | Yamamizu | 358/1.6 |
| 7,731,435 B2 * | 6/2010 | Piersol et al. | 400/62 |
| 2006/0008139 A1 | 1/2006 | Hirota | |
| 2006/0222240 A1 | 10/2006 | Hirota | |
| 2007/0028093 A1 * | 2/2007 | Cowburn et al. | 713/155 |
| 2007/0036470 A1 * | 2/2007 | Piersol et al. | 382/306 |
| 2007/0053005 A1 * | 3/2007 | Cowburn | 358/3.28 |
| 2008/0130038 A1 * | 6/2008 | Igarashi | 358/1.15 |
| 2008/0240816 A1 * | 10/2008 | Piersol et al. | 399/381 |

FOREIGN PATENT DOCUMENTS

| | | |
|---|---|---|
| JP | 11-331626 A | 11/1999 |
| JP | 2001-103288 A | 4/2001 |
| JP | 2001-103299 A | 4/2001 |
| JP | 2004-112644 A | 4/2004 |
| JP | 2005-038389 A | 2/2005 |
| JP | 2006-164180 A | 6/2006 |

* cited by examiner

*Primary Examiner* — James A Thompson
*Assistant Examiner* — Mesfin Getaneh

(57) ABSTRACT

Based on input image data, an area where dots are to be put on by an area ratio that is greater than a second area ratio and less than a first area ratio is searched for, and sheet fingerprint information is obtained from the area found by searching.

3 Claims, 20 Drawing Sheets

SHIFTED HORIZONTALLY BY ONE

NOT SHIFTED VERTICALLY

IMAGE PROCESSING APPARATUS, METHOD OF CONTROLLING IMAGE PROCESSING APPARATUS, PROGRAM, AND STORAGE MEDIUM

BACKGROUND OF THE INVENTION

1. Field of the Invention

The present invention relates to an image processing apparatus, a method of controlling an image processing apparatus, a program, and a storage medium that allow dealing with sheet fingerprint information (hereinafter also referred to as sheet fingerprint).

2. Description of the Related Art

A sheet is formed of interwoven fibers having a width on the order of 20 to 30 micrometers. The interwoven fibers form a random pattern. Such a random pattern is unique to each sheet, similar to fingerprints. Such a random pattern on a sheet is referred to as sheet fingerprint information.

Since sheet fingerprint information is unique to each sheet, by registering that "the original that I issued is a sheet having this specific sheet fingerprint information, this can be used conveniently to later determine whether a sheet is the "original" or a "fake." The term "fake" includes a "copy of the original."

According to techniques disclosed in Japanese Patent Laid-Open No. 2004-112644, when creating an original, with reference to a mark attached on a sheet of the original, an area having a predetermined distance from the mark as a reference position is defined as a sheet-fingerprint-information obtaining area. Furthermore, according to the techniques disclosed in the document, sheet fingerprint information is obtained from the defined sheet-fingerprint-information obtaining area. Furthermore, according to the techniques disclosed in the document, the sheet fingerprint information is encoded to generate an encoded image, and the encoded image is printed on the sheet of the original.

Furthermore, according to the description in paragraph 58 of Japanese Patent Laid-Open No. 2005-038389, it is desired to determine a range of a recording sheet where toner or the like is not attached on the basis of print data, and to define a sheet-fingerprint-information obtaining area in the range.

When a sheet-fingerprint-information obtaining area is defined according to the techniques disclosed in Japanese Patent Laid-Open No. 2004-112644, a flat black area, from which it is not possible to obtain sheet fingerprint information, could be defined as a sheet-fingerprint-information obtaining area. It is an issue to be addressed that a flat black area, from which it is not possible to obtain sheet fingerprint information (or comparison fails even if sheet fingerprint information is obtained), could be defined as a sheet-fingerprint-information obtaining area.

When a sheet-fingerprint-information obtaining area is defined according to the techniques disclosed in Japanese Patent Laid-Open No. 2005-038389, a completely white area could be defined as a sheet-fingerprint-information obtaining area. A completely white area could be cut out by a malicious third party and attached to another sheet. When this happens, the another sheet is recognized as the original.

SUMMARY OF THE INVENTION

According to an aspect of the present invention, there is provided an image processing apparatus including a searching unit configured to search for an area where dots are to be put on by an area ratio that is greater than a second area ratio and less than a first area ratio based on input image data, from a sheet on which the image data is to be printed; and an obtaining unit configured to obtain sheet fingerprint information from the area found from the sheet as a result of searching by the searching unit. The first area ratio is greater than the second area ratio.

Further features of the present invention will become apparent from the following description of exemplary embodiments with reference to the attached drawings.

DESCRIPTION OF THE EMBODIMENTS

Now, exemplary embodiments of the present invention will be described with reference to the drawings.

First Embodiment

Figure 1:
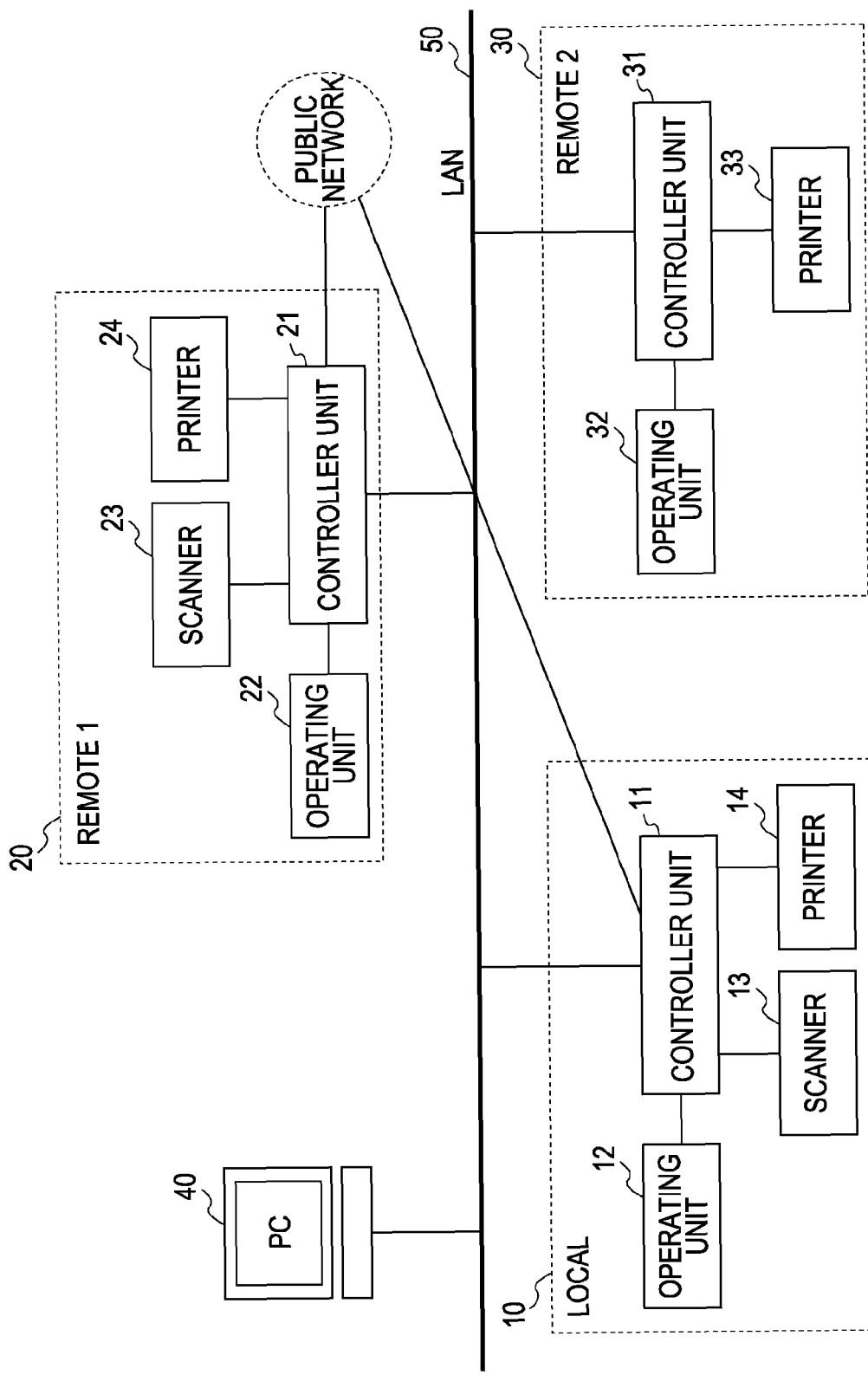
FIG. 1 is a diagram showing the overall configuration of an image forming system.

Printing System (FIG. 1)

Now, a first exemplary embodiment of the present invention will be described in detail with reference to the drawings. FIG. 1 is a block diagram showing the configuration of a printing system according to the first embodiment. In this system, a host computer 40 and three image forming apparatuses 10, 20, and 30 are connected to a local area network (LAN) 50. However, the number of host computers and the number of image forming apparatuses in a printing system according to the present invention are not limited to these numbers. Furthermore, although a LAN is used for connection in this embodiment, without limitation to a LAN, any type of network, such as a wide area network (WAN) (public circuit), a serial transmission bus, such as a USB bus, or a parallel transmission bus, such as a Centronics bus or a SCSI bus, or the like may be used.

The host computer (hereinafter referred to as a PC) 40 has functions of a personal computer. The PC 40 can exchange files or e-mails via the LAN 50 or a WAN according to the File Transfer Protocol (FTP) or the Server Message Block (SMB) protocol. Furthermore, the PC 40 can issue print instructions to the image forming apparatuses 10, 20, and 30 via a printer driver.

The image forming apparatuses 10 and 20 have the same configuration.

The image forming apparatus 10 includes a scanner 13, which is an image input device, a printer 14, which is an image output device, a controller unit 11 that controls the overall operation of the image forming apparatus 10, and an operating unit 12, which serves as a user interface (UI).

The image forming apparatus 20 includes a scanner 23, which is an image input device, a printer 24, which is an image output device, a controller unit 21 that controls the overall operation of the image forming apparatus 20, and an operating unit 22, which serves as a user interface (UI).

The image forming apparatus 30 includes a printer 33, which is an image output device, a controller unit 31 that controls the overall operation of the image forming apparatus 30, and an operating unit 32, which serves as a user interface (UI). Unlike image forming apparatuses 10 and 20, the image forming apparatus 30 does not include 1 scanner.

In the following description, for simplicity, of the image forming apparatuses 10 and 20, the configuration will be described in detail with regard to the image forming apparatus 10.

Figure 2:
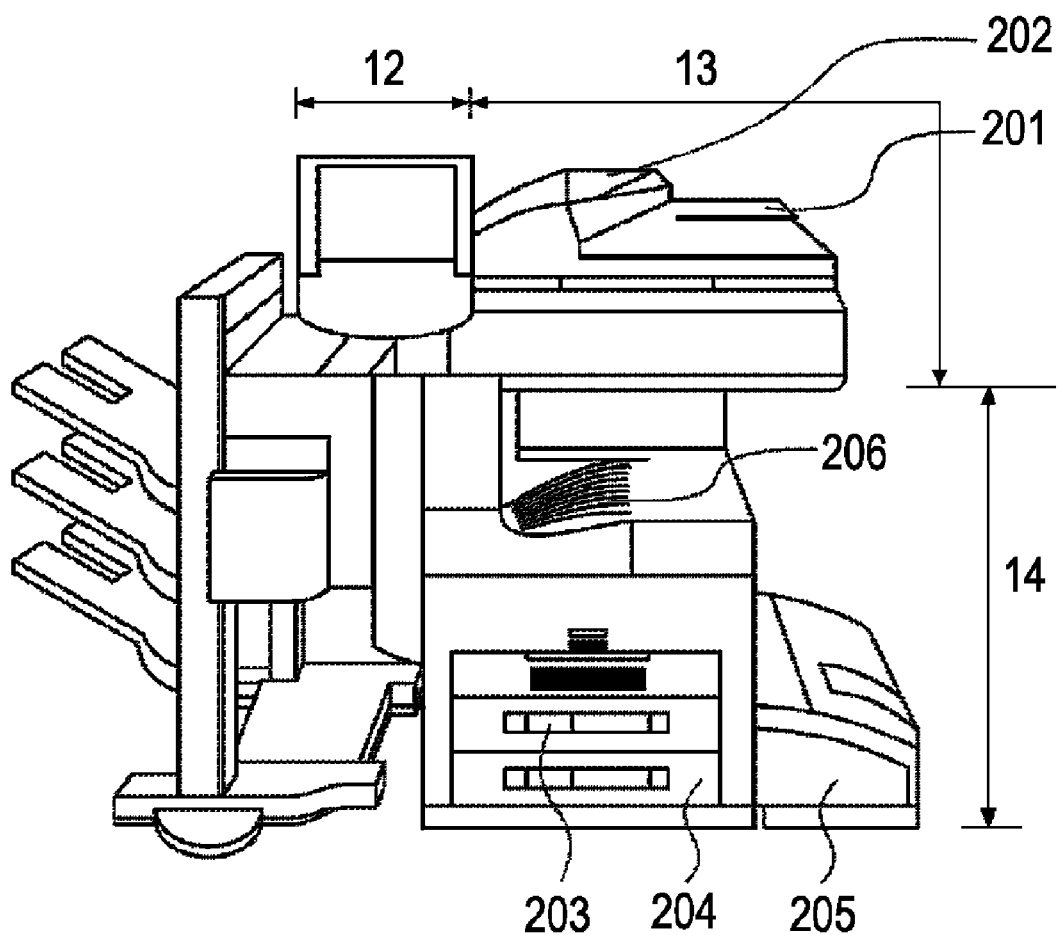
FIG. 2 is an external view of an input/output device of an image forming apparatus.

Image Forming Apparatus 10 (FIG. 2)

FIG. 2 shows an external view of the image forming apparatus 10. The scanner 13 includes a plurality of charge coupled devices (CCDs). If the sensitivities of the individual CCDs vary, even if the intensities of some pixels on an original document are the same, the intensities of the pixels are recognized as different intensities. Thus, the scanner first exposes and scans a uniformly white plate, converts the amounts of reflected light into electric signals, and outputs the electric signals to the controller unit 11. As will be described later, a shading correction unit 500 in the controller unit 11 recognizes the difference among the sensitivities of the individual CCDs on the basis of the electric signals obtained from the individual CCDs. Then, the shading correction unit 500 corrects the values of electric signals obtained by scanning an image on the original document. Furthermore, the shading correction unit 500 adjusts a gain on the basis of gain adjustment information received from a central processing unit (CPU) 301 in the controller unit 11, which will be described later. The gain adjustment serves to adjust how the values of the electric signals obtained by exposing and scanning the original document are converted into the values 0 to 255 of luminance signals. This gain adjustment allows converting the values of the electric signals obtained by exposing and scanning the original document into relatively large values of luminance signals or relatively small values of luminance signals. Next, a configuration for scanning an image on the original document will be described.

In the scanner 13, reflected light obtained by exposing and scanning the image on the original document is input to the CCDs to convert image information into electric signals. Furthermore, the electric signals are converted into luminance signals of RGB color components, and the luminance signals are output to the controller unit 11 as image data.

The original document is set on a tray 202 of an original document feeder 201. When a user issues a reading start instruction from the operating unit 12, the controller unit 11 instructs the scanner 13 to read the original document. Upon receiving the instruction, the scanner 13 feeds sheets of the original document one by one from the tray 202 of the original document feeder 201, and the sheets of the original document are read. Instead of automatic feeding by the original document feeder 201, the original document may be read by placing the original document on a glass table (not shown) and scanning the original document by moving an exposure device.

The printer 14 is an image forming device that forms an image corresponding to image data received from the controller unit 11 on a sheet. Although images are formed by electrophotography using a photosensitive drum or a photosensitive belt in this embodiment, the present invention is not limited to these examples. For example, the present invention is applicable to ink jet printing, in which ink is ejected from a micro nozzle array to print information on a sheet. Furthermore, the printer 14 has a plurality of sheet cassettes 203, 204, and 205 that allows selection of different sheet sizes or sheet orientations. An ejection tray 206 receives sheets that are ejected after printing.

Figure 3:
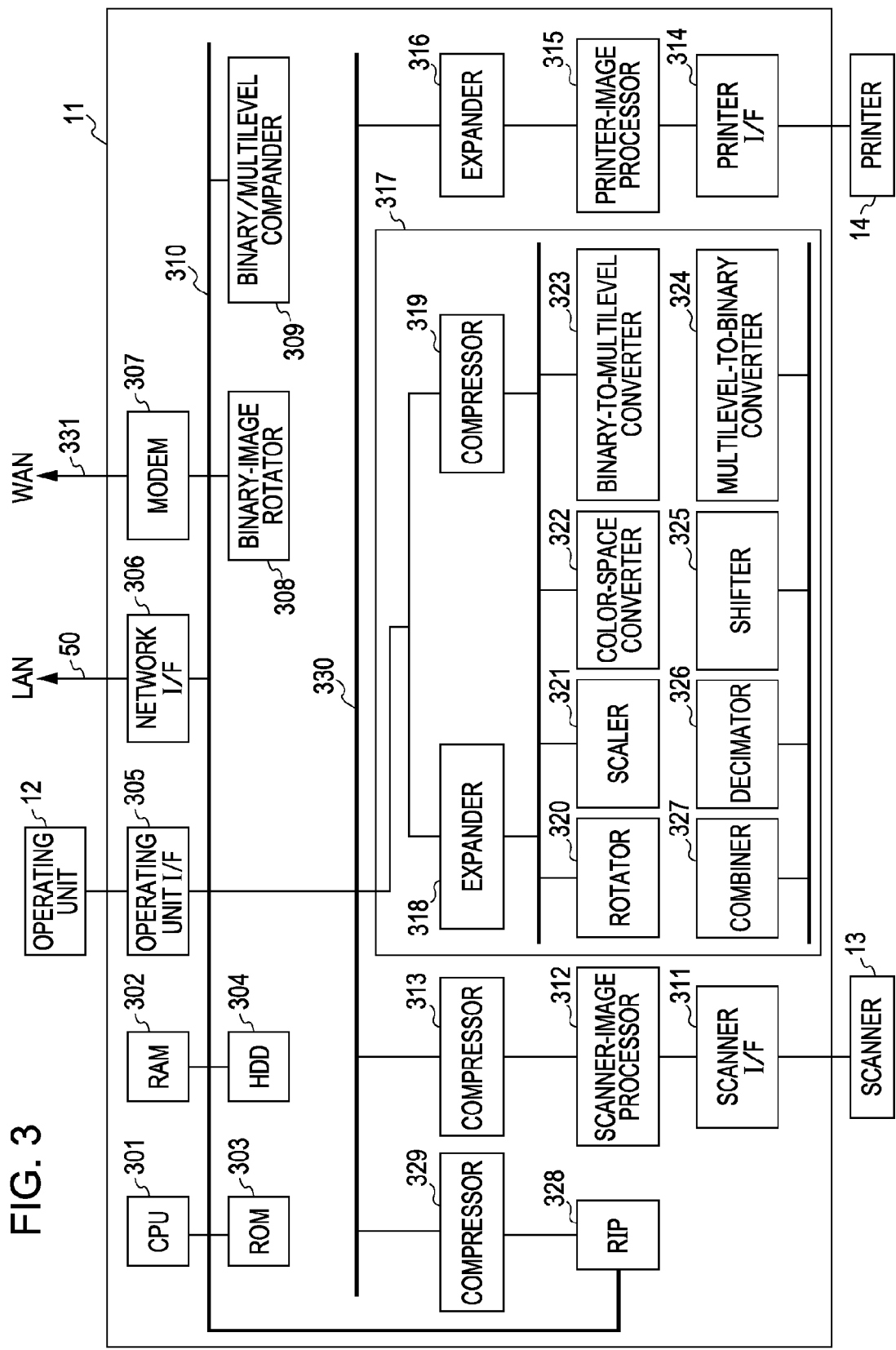
FIG. 3 is a diagram showing the overall configuration of the image forming apparatus.

Detailed Description of the Controller Unit 11 (FIG. 3)

FIG. 3 is a block diagram showing the configuration of the controller unit 11 of the image forming apparatus 10 in more detail.

The controller unit 11 is electrically connected to the scanner 13 and the printer 14. Furthermore, the controller unit 11 is also connected to the PC 40 and other external devices via the LAN 50 or a WAN 331. Thus, input and output of image data and device information are allowed.

A central processing unit (CPU) 301 exercises overall control on accesses to various devices in connection and also exercises overall control on various processes executed within the controller unit 11 according to control programs or the like stored in a read-only memory (ROM) 303. A random access memory (RAM) 302 is a system work memory for the operation of the CPU 301, and is also used to temporarily store image data. The RAM 302 is implemented by a static RAM (SRAM), which maintains stored content even after it is powered off, and a dynamic RAM (DRAM), with which stored content is discarded when it is powered off. The ROM 303 stores a device boot program or the like. A hard disk drive (HDD) 304 allows storing system software, image data, and so forth.

The operating-unit IF 305 is an interface that connects a system bus 310 to the operating unit 12. The operating-unit IF 305 receives image data for displaying an image on the operating unit 12 from the system bus 310, and outputs the image data to the operating unit 12. Furthermore, the operating-unit I/F 305 outputs information input from the operating unit 12 to the system bus 310.

A network I/F 306 is connected to the LAN 50 and the system bus 310 to allow input and output of information. A modem 307 is connected to the WAN 331 and the system bus 310 to allow input and output of information. A binary-image rotator 308 converts the orientation of image data before transmission. A binary-image compander 309 converts the resolution of image data before transmission into a predetermined resolution or a resolution suitable for the capability of a recipient. The binary-image compander 309 executes compression and expansion according to the JBIG, MMR, MR, or MH algorithm. An image bus 330 is used to exchange image data, and is implemented by a PCI bus or an IEEE 1394 bus.

A scanner-image processor 312 corrects, processes, or edits image data received from the scanner 13 via a scanner I/F 311. The scanner-image processor 312 checks whether the received image data represents a color original document or a monochrome original document, a text original document or a picture original document, and so forth. Then, the scanner-image processor 312 attaches information representing the result of checking to the image data. The attached information will be referred to as property data. The processing executed by the scanner-image processor 312 will be described later in detail.

Figure 4:
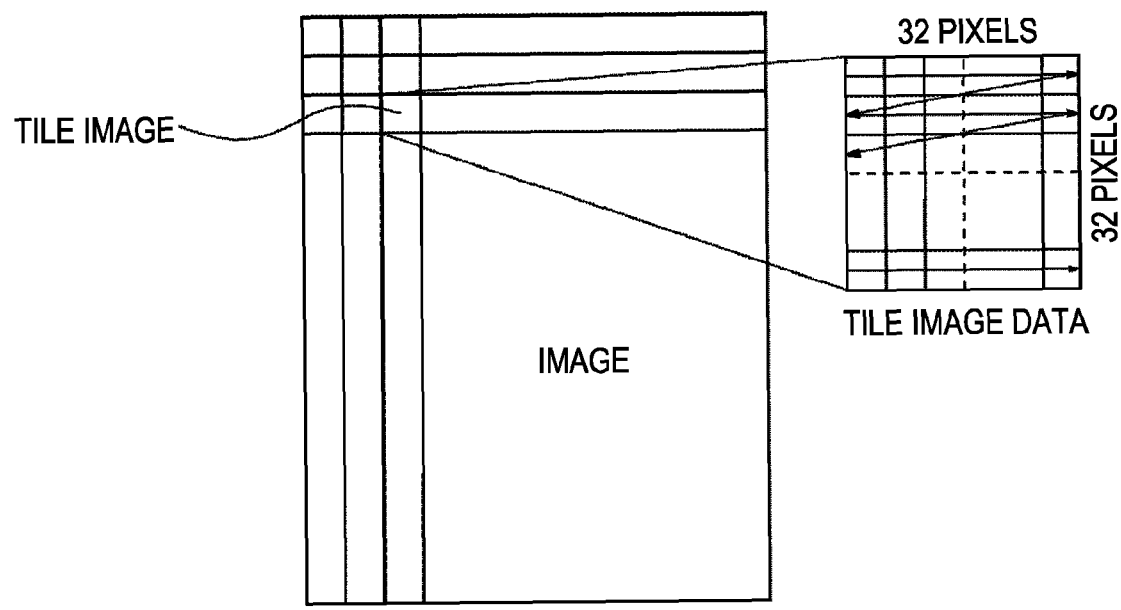
FIG. 4 is a diagram showing tile data.

A compressor 313 receives image data, and divides the image data into blocks of 32 pixels×32 pixels. The image data of 32×32 pixels will be referred to as tile data. FIG. 4 shows the tile data. An area of an original document (sheet medium before reading) corresponding to the tile data will be referred to as a tile image. The tile data has attached thereto header information including an average luminance in the block of 32×32 pixels and a coordinate position of the tile image on the original document. Furthermore, the compressor 313 compresses image data composed of a plurality of pieces of tile data. An expander 316 expands image data composed of a plurality of pieces of tile data, converts the expanded image data into raster image data, and sends the raster image data to a printer-image processor 315.

The printer-image processor 315 receives image data sent from the expander 316, and executes image processing on the image data while referring to property data attached to the image data. The processed image data is output to the printer 14 via a printer I/F 314. The processing executed by the printer-image processor 315 will be described later in detail.

An image converter 317 executes a predetermined conversion on image data. The image converter 317 includes components described below.

An expander 318 expands received image data. A compressor 319 compresses received image data. A rotator 320 rotates received image data. A scaler 321 converts the resolution of received image data (e.g., 600 dpi to 200 dpi). A color-space converter 322 converts the color space of received image data. The color-space converter 322 can execute known background removal using a matrix or a table, known log conversion (RGB to CMY), or known output-color correction (CMY to CMYK). A binary-to-multilevel converter 323 converts received bi-level image data into 256-level image data. Conversely, a multilevel-to-binary converter 324 converts received 256-level image data into binary image data, for example, by error diffusion.

A combiner 327 combines two pieces of received image data to generate a single piece of image data. When combining two pieces of image data, for example, an average of luminance values of pixels to be combined is used as a combined luminance value, or a luminance value of a pixel with a higher luminance level is used as a combined luminance value. Alternatively, a luminance value of a pixel with a lower luminance level may be used as a combined luminance value. Furthermore, a combined luminance value may be determined by logical OR, logical AND, exclusive OR, or the like using pixels to be combined. These methods of combination are all known techniques. A decimator 326 decimates pixels of received image data to convert the resolution of the image data, thus generating image data with the number of pixels reduced to ½, ¼, ⅛, or the like. A shifter 325 adds a margin to or removes a margin from received image data.

A raster image processor (RIP) 328 receives intermediate data generated from page description language (PDL) code data sent from the PC 40 or the like, and generates (multi-level) bitmap data from the intermediate data. The intermediate data processed by the RIP 328 may be compressed by a compressor 329.

Figure 5:
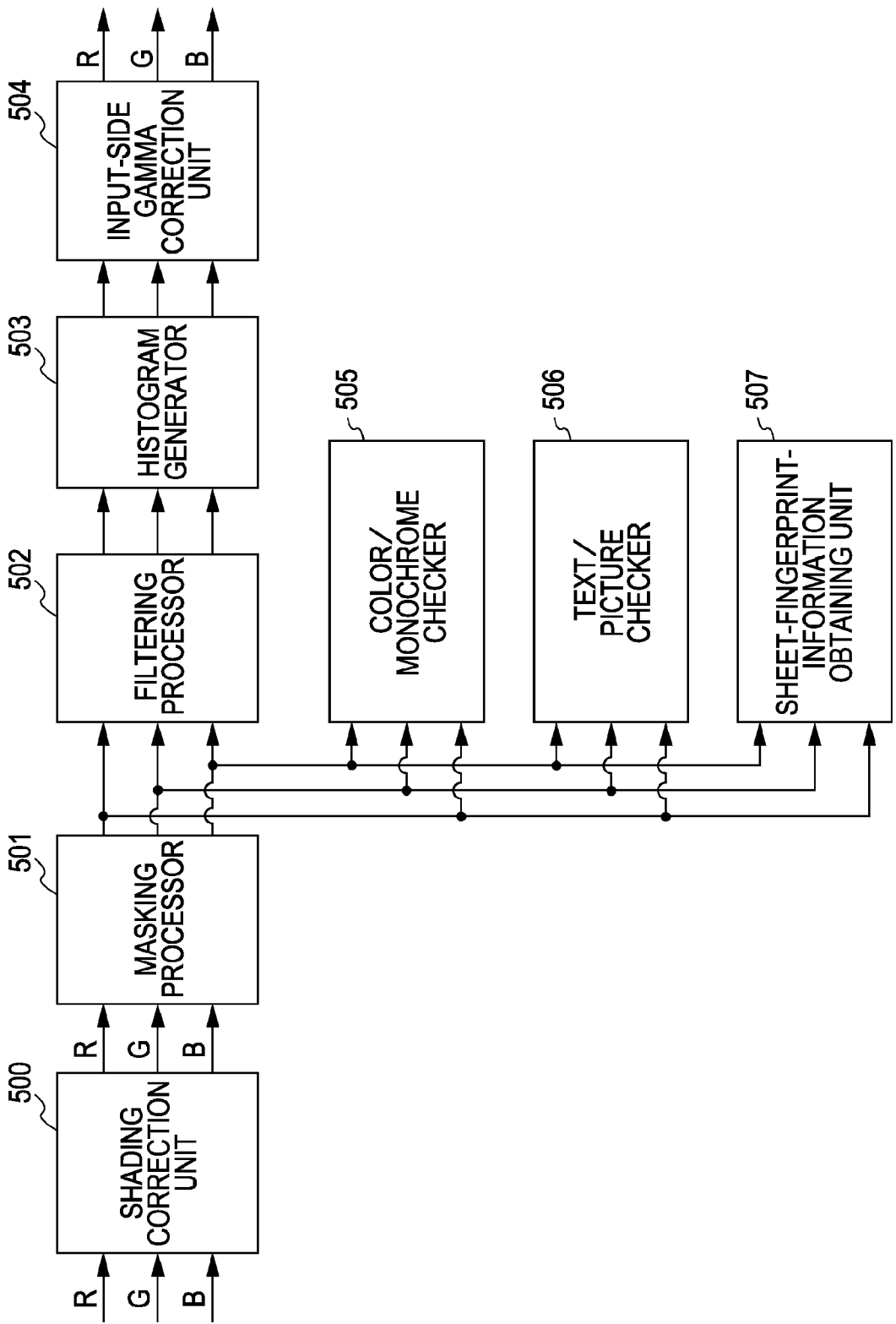
FIG. 5 is a block diagram of a scanner-image processor.

Detailed Description of the Scanner-Image Processor 312 (FIG. 5)

FIG. 5 shows the internal configuration of the scanner-image processor 312.

The scanner-image processor 312 receives image data composed of luminance signals composed of RGB components each having 8 bits.

A shading correction unit 500 executes shading correction on the luminance signals. The shading correction serves to prevent incorrect recognition of the luminance levels of the original document due to the variation of the sensitivities of the CCDs as described earlier. Furthermore, as described earlier, the shading correction unit 500 can adjust the gain according to an instruction from the CPU 301.

Then, the luminance signals are converted by a masking processor 501 into standard luminance signals that do not depend on the filter colors of the CCDs.

A filtering processor 502 corrects the spatial frequencies of received image data as desired. The filtering processor 502 executes an operation on received image data using, for example, a 7×7 matrix. In a copying machine or a multifunction machine, it is possible to select a copying mode by pressing a button 704 shown in FIG. 7, such as a text mode, a picture mode, or a text/picture mode. When the text mode is selected by a user, the filtering processor 502 applies a filter for text to the entire image data. When the picture mode is selected, the filtering processor 502 executes a filter for picture to the entire image data. When the text/picture mode is selected, the filtering processor 502 switches the filter that is used for each pixel adaptively according to a text/picture checking signal (a part of property data), which will be described later. That is, it is determined for each pixel whether the filter for picture or the filter for text is to be applied. The filter for picture is configured to have coefficients with which only high-frequency components are smoothed so that the texture of the image will not be rough. On the other hand, the filter for text is configured to have coefficients with which edges are enhanced so that characters will be displayed sharply.

A histogram generator 503 samples luminance data of individual pixels of received image data. More specifically, the histogram generator 503 samples luminance data in a rectangular region defined by start points and end points defined for a main scanning direction and a sub-scanning direction, at predetermined pitches in the main scanning direction and the sub-scanning direction. Then, the histogram generator 503 generates histogram data on the basis of the results of sampling. The histogram data is used to estimate a background level for background removal. An input-side gamma correction unit 504 converts received data into non-linear luminance data using a table or the like.

A color/monochrome checker 505 checks whether each pixel of received image data has a color or is monochrome, and attaches the result of checking to the image data as a color/monochrome checking signal (a part of property data).

A text/picture checker 506 checks whether each pixel of the image data is a pixel constituting a character, a pixel constituting a dot, a pixel constituting a character in dots, or a pixel constituting a flat image, on the basis of the pixel value of the pixel and the pixel values of neighboring pixels. When the pixel does not fall in any of these categories, the pixel is a pixel constituting a white region. Then, the result of checking is attached to the image data as a text/picture checking signal (a part of property data).

A sheet-fingerprint-information obtaining unit 507 determines an appropriate area as a sheet-fingerprint-information obtaining area from the RGB image data input from the shading correction unit 500, and obtains image data of the sheet-fingerprint-information obtaining area. The method of determining an appropriate area as a sheet-fingerprint-information obtaining area will be described later with reference to FIGS. 13 and 15.

Figure 8:
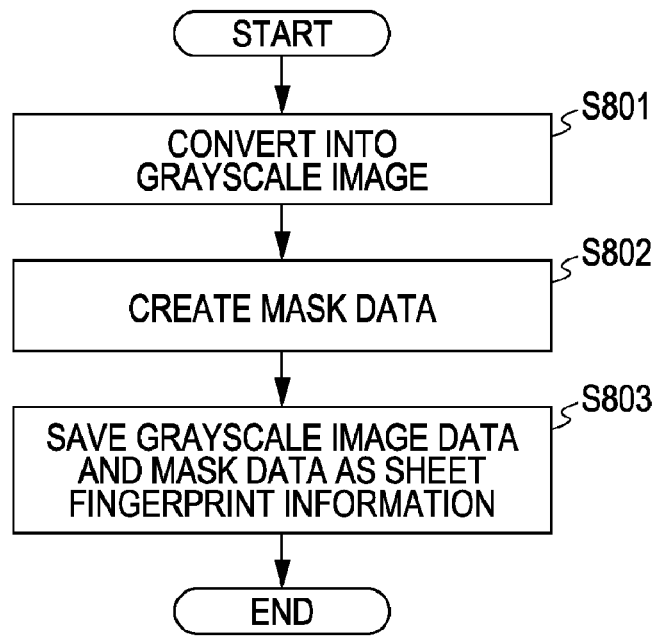
FIG. 8 is a flowchart of processing executed by a sheet-fingerprint-information obtaining unit in S1602 shown in FIG. 16.

FIG. 8 is a flowchart of a sheet-fingerprint-information obtaining process executed by the sheet-fingerprint-information obtaining unit 507.

In step S801, image data obtained by the sheet-fingerprint-information obtaining unit 507 is converted into grayscale image data. In step S802, mask data that is to be used for comparison is generated. In the mask data, elements that could cause incorrect recognition, such as printed or handwritten characters, are removed from an image represented by the grayscale image data obtained in step S801. The mask data is binary data composed of bits each represented by "0" or "1." In the grayscale image data, for each pixel having a luminance value greater (i.e., brighter) than or equal to a first threshold, "1" is set as the value of the mask data. On the other hand, for each pixel having a luminance value less than the first threshold, "0" is set as the value of the mask data. This processing is executed for each pixel included in the grayscale image data. In step S803, the grayscale image data obtained by conversion in step S801 and the mask data generated in step S802 are obtained as sheet fingerprint information. Although the grayscale image data obtained in step S801 can be referred to as sheet fingerprint information, the two pieces of data are referred to as sheet fingerprint information in this embodiment.

The sheet-fingerprint-information obtaining unit 507 sends the sheet fingerprint information of the sheet-fingerprint-information obtaining area to the RAM 302 via a data bus (not shown).

Figure 6:
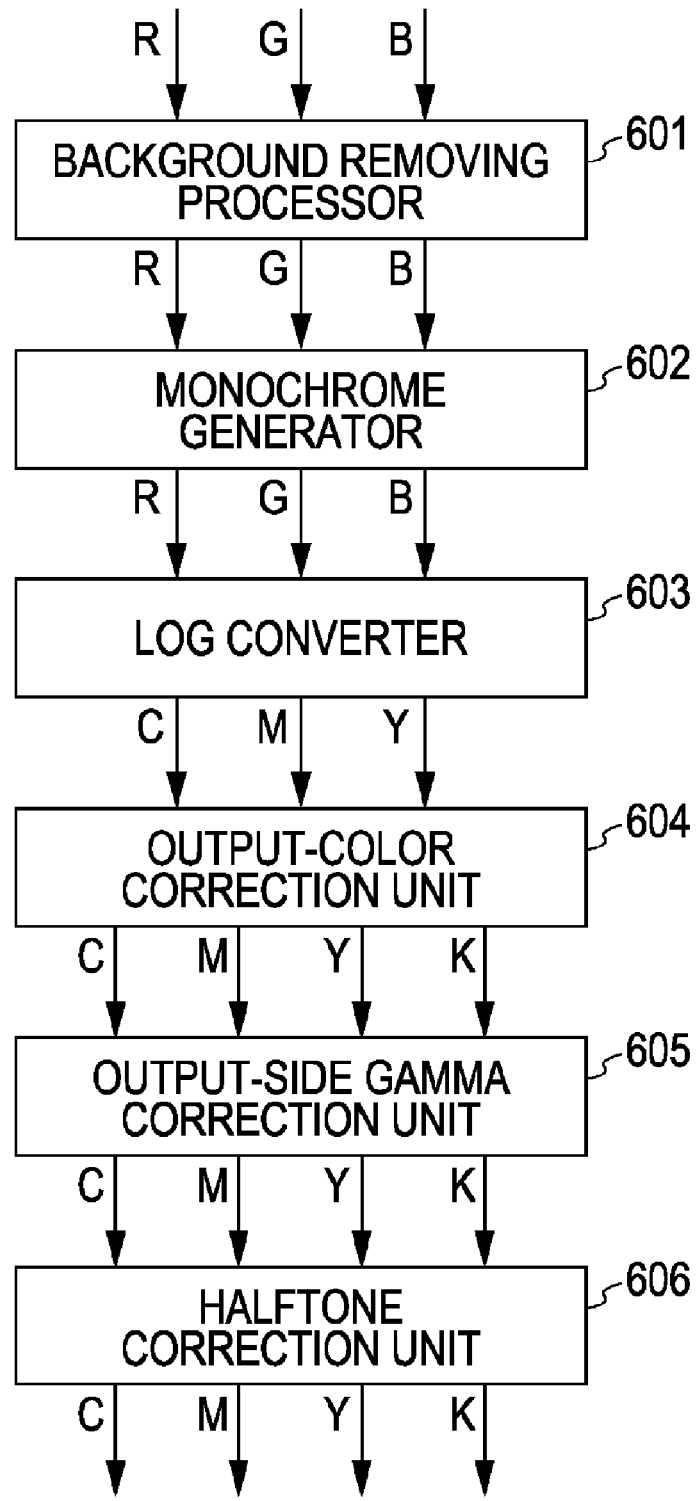
FIG. 6 is a block diagram of a printer-image processor.

Detailed Description of the Printer-Image Processor 315 (FIG. 6)

FIG. 6 shows a flow of processing executed by the printer-image processor 315.

A background removing processor 601 removes the background of image data using the histogram generated by the scanner-image processor 312. A monochrome generator 602 coverts color data into monochrome data. A log converter 603 executes luminance density conversion. For example, the log converter 603 converts input RGB image data into CMY image data. An output-color correction unit 604 corrects output colors. For example, the output-color correction unit 604 converts input CMY image data into CMYK image data using a table or a matrix. An output-side gamma correction unit 605 executes correction so that the values of intensity of reflection of a copied output become proportional to the values of signals input to the output-side gamma correction unit 605. A halftone correction unit 606 executes halftone processing in accordance with the number of levels that can be represented by a printer used for output. For example, the halftone correction unit 606 converts image data represented with a large number of levels into bi-level or 32-level image data.

Each of the processing units in the scanner-image processor 312 and the printer-image processor 315 can output received image data without processing the image data. Hereinafter, passing data through a processing unit without executing processing therein will be referred to as "passing the data through the processing unit."

Sheet-Fingerprint-Information Registering Process

The CPU 301 can read sheet fingerprint information of a certain area, sent from the sheet-fingerprint-information obtaining unit 507 to the RAM 302, and register the sheet fingerprint information in a server (not shown). This registration can be achieved by execution of a program stored in the RAM 302.

Sheet-Fingerprint-Information Comparing Process

The CPU 301 can read the sheet fingerprint information sent from the sheet-fingerprint-information obtaining unit 507 to the RAM 302, and exercise control to compare the sheet fingerprint information with another piece of sheet fingerprint information. In this embodiment, the another piece of sheet fingerprint information refers to sheet fingerprint information that has been registered in the server.

Figure 9:
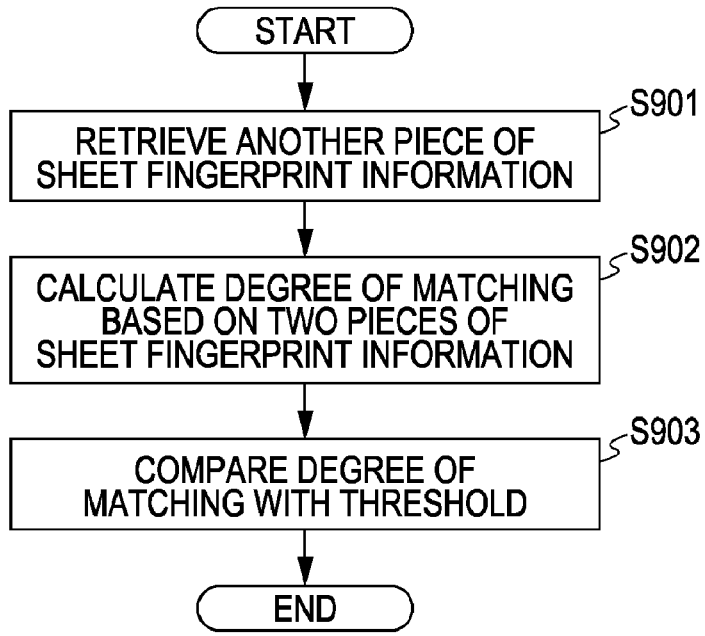
FIG. 9 is a flowchart of processing executed in S1703 shown in FIG. 17.

FIG. 9 is a flowchart of the sheet-fingerprint-information comparing process. The CPU 301 controls the overall flow of the steps in this flowchart.

In step S901, sheet fingerprint information that has been registered in the server is retrieved.

In step S902, the sheet fingerprint information received from the sheet-fingerprint-information obtaining unit 507 (i.e., the sheet fingerprint information that has just been extracted) is compared with the sheet fingerprint information retrieved in step S901 (i.e., the registered sheet fingerprint information). Before comparing these pieces of sheet fingerprint information, considering a possibility that the registered sheet fingerprint information and the sheet fingerprint information that has just been extracted are obtained from different positions, positional deviation is corrected in the manner described below.

Correction of Positional Deviation

First, $(2n-1)\times(2m-1)$ errors $E(i, j)$ ($(i, j)$ representing a positional deviation between the two pieces of sheet fingerprint information) between the two pieces of sheet fingerprint information are obtained using equation (1) below:

$$E(i, j) = \frac{\sum_{x,y} \alpha_1(x, y)\alpha_2(x-i, y-j)\{f_1(x, y) - f_2(x, y)\}^2}{\sum_{x,y} \alpha_1(x, y)\alpha_2(x-i, y-j)} \quad (1)$$

In equation (1), $\alpha_1$ denotes mask data in the sheet fingerprint information retrieved in step S901 (i.e., the registered sheet fingerprint information). $f_1$ denotes grayscale image data in the sheet fingerprint information retrieved in step S901 (i.e., the registered sheet fingerprint information). $\alpha_2$ denotes mask data in the sheet fingerprint information received from the sheet-fingerprint-information obtaining unit 507 in step S902 (i.e., the sheet fingerprint information that has just been extracted). $f_2$ denotes grayscale image data in the sheet fingerprint information received from the sheet-fingerprint-information obtaining unit 507 in step S902 (i.e., the sheet fingerprint information that has just been extracted).

Figure 19A:
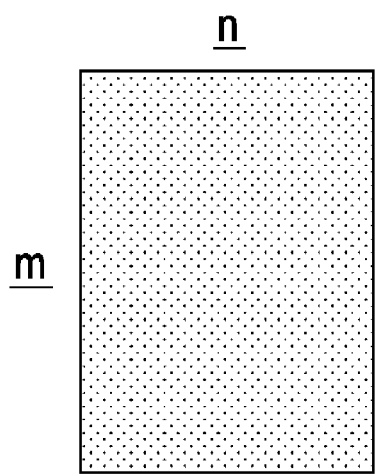
FIGS. 19A and 19B are diagrams showing registered sheet fingerprint information and currently obtained sheet fingerprint information.
Figure 19B:
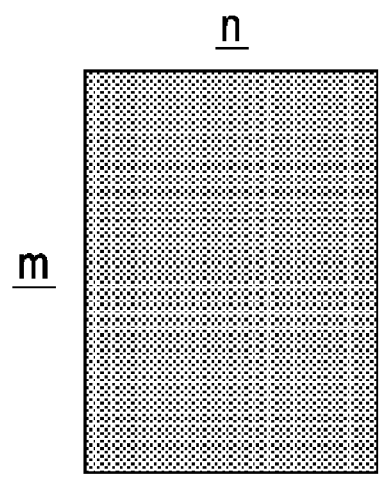

Specific methods will be described with reference to FIGS. 19, 20, 21, and 22. FIGS. 19A and 19B show the registered sheet fingerprint information and the currently obtained sheet fingerprint information, each composed of horizontally n×vertically m pixels.

In the function expressed in equation (1), i and j are shifted pixel by pixel in a range of (−n+1) to (n−1) and in a range of (−m+1) to (m−1), respectively, thus obtaining (2n−1)×(2m−1) errors E(i, j) between the registered sheet fingerprint information and the currently obtained sheet fingerprint information. That is, errors E(−n+1, −m+1) to E(n−1, m−1) are obtained.

Figure 20A:
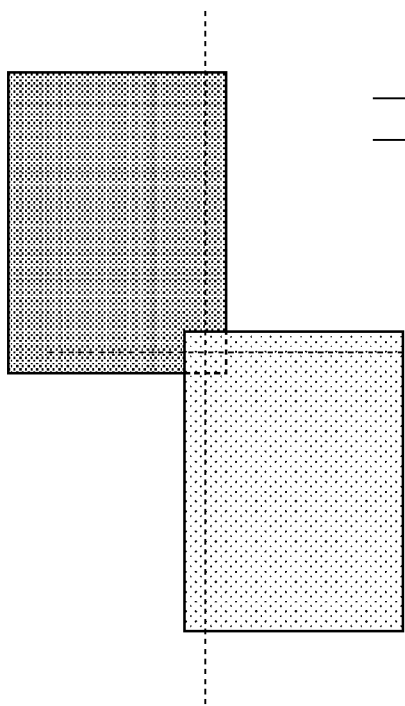
FIGS. 20A to 20D are diagrams for explaining how to obtain errors of sheet fingerprint information.
Figure 20B:
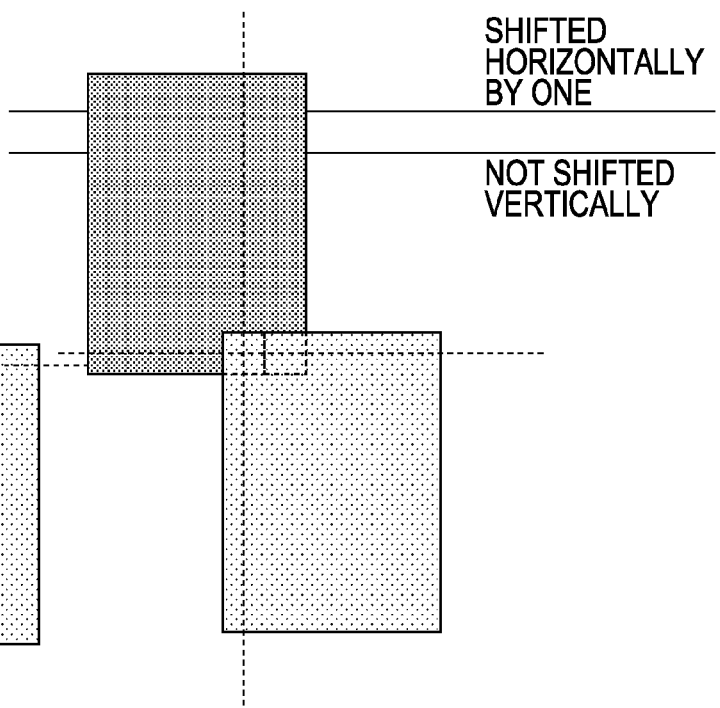
Figure 20C:
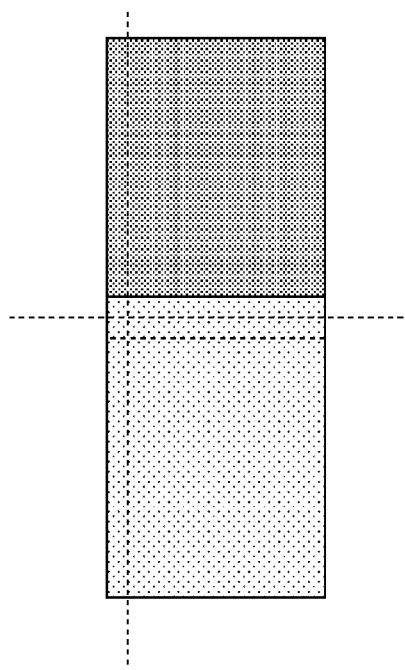
Figure 20D:
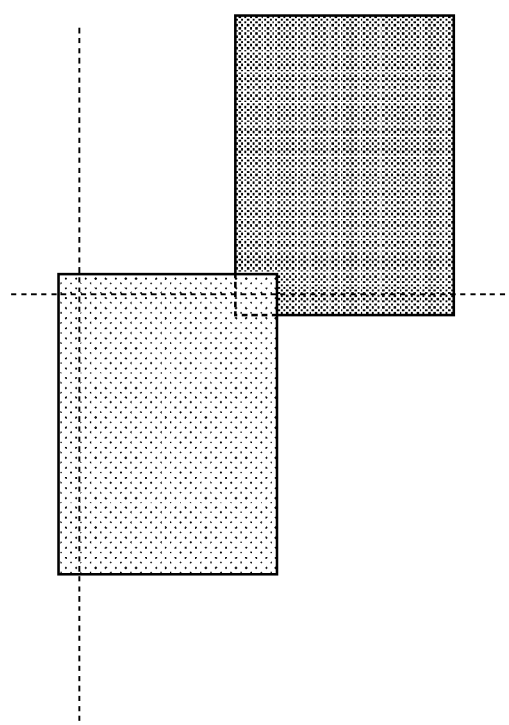

FIG. 20A shows a case where only one pixel at the bottom right of the currently obtained sheet fingerprint information overlaps one pixel at the top left of the registered sheet fingerprint information. The value obtained by the function expressed in equation (1) in this state is denoted as E(−n+1, −m+1). FIG. 20B shows a case where the currently obtained sheet fingerprint information is shifted rightward by one pixel compared to the case shown in FIG. 20A. The value obtained by the function expressed in equation (1) in this state is denoted as E(−n+2, −m+1). Similarly, errors are calculated while shifting the currently obtained sheet fingerprint information. FIG. 20C shows a case where the currently obtained sheet fingerprint information is shifted so as to overlap the registered sheet fingerprint information, so that an error (0, −(m−1)) is obtained. Furthermore, FIG. 20D shows a case where the currently obtained sheet fingerprint information is shifted to the right end, so that an error E(n−1, −m+1) is obtained. As described above, as the currently obtained sheet fingerprint information is shifted horizontally, i in E(i, j) is incremented one by one.

Figure 21A:
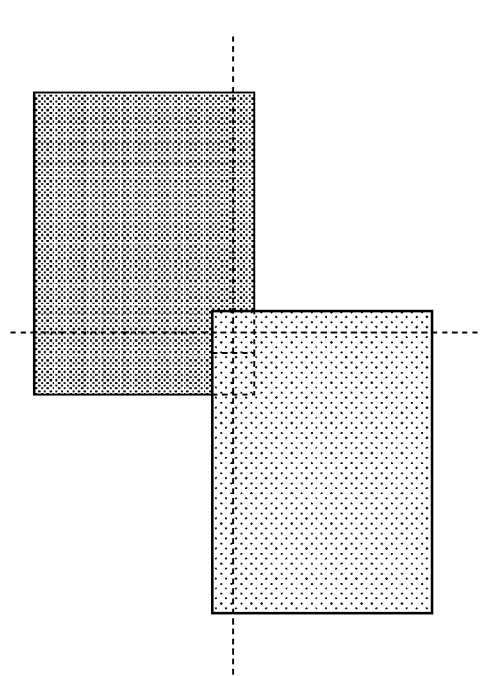
FIGS. 21A and 21B are diagrams for explaining how to obtain errors of sheet fingerprint information.

Similarly, FIG. 21A shows a case where the currently obtained sheet fingerprint information is shifted vertically downward by one pixel, so that an error E(−n+1, −m+2) is obtained.

Figure 21B:
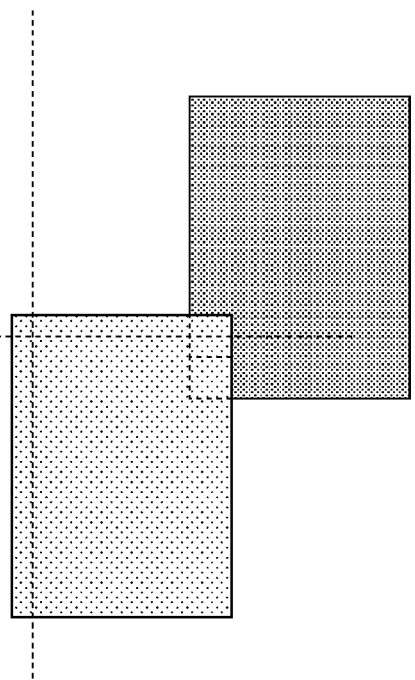

Furthermore, FIG. 21B shows a case where the currently obtained sheet fingerprint information is shifted to the right end from the state shown in FIG. 21A, so that an error E(n−1, −m+2) is obtained.

Figure 22A:
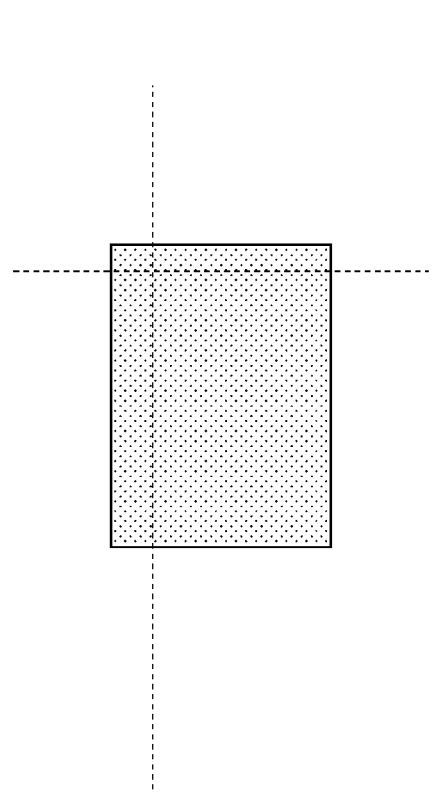
FIGS. 22A and 22B are diagrams for explaining how to obtain errors of sheet fingerprint information.

FIG. 22A shows a case where the registered sheet fingerprint information and the currently obtained sheet fingerprint information are taken from corresponding positions. The value of the error E(i, j) in this case is denoted as E(0, 0).

Figure 22B:
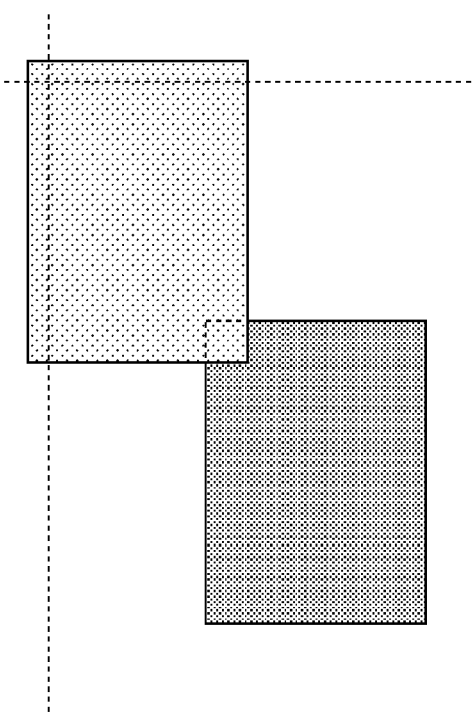

Similarly, errors are calculated while shifting the image so that the pieces of sheet fingerprint information overlap each other at least by one pixel. Finally, as shown in FIG. 22B, an error E(n−1, m−1) is obtained.

Thus, a set of (2n−1)×(2m−1) errors E(i, j) is obtained.

Now, in order to understand the meaning of equation (1), a case where i=0 and j=0, $\alpha_1(x, y)=1$ (where x=0 to n and y=0 to m), and $\alpha_2(x-i, y-j)=1$ (where x=0 to n and y=0 to m) will be considered. That is, the error E(0, 0) in the case where $\alpha_1(x, y)=1$ (where x=0 to n and y=0 to m), and $\alpha_2(x-i, y-j)=1$ (where x=0 to n and y=0 to m) will be obtained.

As in the case shown in FIG. 22A, i=0 and j=0 indicate that the registered sheet fingerprint information and the currently obtained sheet fingerprint information are taken from corresponding positions.

$\alpha_1(x, y)=1$ (where x=0 to n and y=0 to m) indicates that all the pixels in the registered sheet fingerprint information are bright. That is, when the registered sheet fingerprint information was obtained, no color material, such as toner or ink, or dust was present on the sheet-fingerprint-information obtaining area.

$\alpha_2(x-i, y-j)=1$ (where x=0 to n and y=0 to m) indicates that all the pixels in the currently obtained sheet fingerprint information are bright. That is, when the currently obtained sheet fingerprint information was obtained, no color material, such as toner or ink, or dust was present on the sheet-fingerprint-information obtaining area. As described above, when $\alpha_1(x, y)=1$ and $\alpha_2(x-i, y-j)=1$ are satisfied for all the pixels, equation (1) can be rewritten as equation (2) below $$E(0, 0) = \sum_{x=0, y=0}^{n,m} \{f_1(x, y) - f_2(x, y)\}^2 \tag{2}$$

In equation (2), $\{f1(x, y)-f2(x, y)\}^2$ denotes a squared difference between the grayscale image data in the registered sheet fingerprint information and the grayscale image data in the currently obtained sheet fingerprint information. Thus, equation (2) represents a sum of squares of the differences at the individual pixels between the two pieces of sheet fingerprint information. That is, as the number of pixels for which f1(x, y) and f2(x, y) are similar increases, the value of E(0, 0) decreases.

Similarly to the method of obtaining the error E(0, 0) described above, other errors E(i, j) are obtained. Since the value of E(0, 0) decreases as the number of pixels for which $f_1(x, y)$ and $f_2(x, y)$ are similar increases, when E(k, l)=min{E(i, j)}, it is understood that the position where the registered sheet fingerprint information was obtained and the position where the currently obtained sheet fingerprint information was obtained were shifted by (k, l) from each other.

Meaning of α

The numerator in equation (1) represents a result of multiplying $\{f_1(x, y)-f_2(x-i, y-j)\}^2$ by $\alpha_1$ and $\alpha_2$ (more precisely, a sum of products is obtained by the Σ symbol). Each of $\alpha_1$ and $\alpha_2$ has a value of 0 for a pixel with a dense color, and has a value of 1 for a pixel with a light color.

Thus, when either one of (or both) $\alpha_1$ and $\alpha_2$ is 0, $(\alpha_1 \alpha_2 \{f_1(x, y)-f_2(x-i, y-j)\}^2$ becomes 0.

That is, when the target pixel in either one (or both) of the pieces of sheet fingerprint information has a dense color, the difference in intensity at the pixel is not considered, so that a pixel on which dust or color material is present is disregarded.

With this processing, the number of terms added up by the Σ symbol changes. Thus, the sum is normalized by division by the total number $\Sigma\alpha_1(x, y)\alpha_2(x-i, y-j)$. An error E(i, j) for which $\Sigma\alpha_1(x, y)\alpha_2(x-i, y-j)$ in the denominator in equation (1) becomes 0 is not included in the set of errors E(−(n−1), −(m−1)) to E(n−1, m−1), which will be described later.

Method of Determining a Degree of Matching

As described earlier, when E(k, l)=min{E(i, j)}, it is understood that the position where the registered sheet fingerprint information was obtained and the position where the currently obtained sheet fingerprint information was obtained were shifted by (k, l) from each other.

Next, a value indicating how approximate the two pieces of sheet fingerprint information are (hereinafter referred to as a matching degree) is obtained using the error E(k, l) and the other errors E(i, j).

First, an average value (40) is obtained from the set of errors obtained by the function expressed as equation (1) (e.g., E(0, 0)=10*, E(0, 1)=50, E(1, 0)=50, E(1, 1)=50). •••(A)

The * symbol does not represent any value, but is simply provided to call attention to the associated value because of a reason that is described later.

Then, the individual errors (10*, 50, 50, 50) are subtracted from the average value (40) to obtain a new set (30*, −10, −10, −10). •••(B)

Then, on the basis of the new set, a standard deviation is obtained (30×30+10×10+10×10+10×10=1,200, 1,200/4=300, $\sqrt{300}$=10$\sqrt{3}$≈17). Then, the values in the new set are divided by 17, and (1*, −1, −1, −1) are obtained. •••(C)

A maximum value among these values is determined as a matching degree (1*). This value of 1* is associated with the error $E(0, 0)$=10*. In this case, $E(0, 0)$ is a value that satisfies $E(0, 0)$=min{$E(i, j)$}.

Overview of the Method of Determining the Matching Degree

In the processing for determining the matching degree, a degree of deviation of a minimum error among a set of errors from an average error is calculated (A and B).

Then, the degree of deviation is divided by a standard deviation to obtain a matching degree (C).

Finally, the matching degree is compared with a threshold to obtain a result of comparison (D).

The standard deviation refers to an average of the differences between the individual errors and the average. That is, the standard deviation indicates approximate overall variation in the set.

By dividing the degree of variation by the value indicating the overall variation, it is possible to recognize how small min{$E(i, j)$} is in the set $E(i, j)$ (prominently small or slightly small).

The matching degree is determined as valid when min{$E(i, j)$} is prominently small in the set $E(i, j)$, and is otherwise determined as invalid (D).

Reason for Determining the Matching Degree as Valid when min{$E(i, j)$} is Prominently Small in the Set $E(i, j)$ Now, suppose that the registered sheet fingerprint information and the currently obtained sheet fingerprint information were obtained from the same sheet.

Then, a certain positional deviation with which the registered sheet fingerprint information and the currently obtained sheet fingerprint information match well is supposed to exist. With this positional deviation, since the registered sheet fingerprint information and the currently obtained sheet fingerprint information match very well, $E(i, j)$ is expected to be very small.

On the other hand, when the positional deviation is changed even slightly, the registered sheet fingerprint information and the currently obtained sheet fingerprint information have substantially no correlation. Thus, $E(i, j)$ is expected to be a large value.

Therefore, the condition that "the two pieces of sheet fingerprint information were obtained from the same sheet" coincides with the condition that "the minimum $E(i, j)$ is prominently small in the set $E(i, j)$."

The description now returns to the sheet-fingerprint-information comparing process.

In step S903, the matching degree between the two pieces of sheet fingerprint information, obtained in step S902, is compared with a predetermined threshold to determine whether the matching degree is "valid" or "invalid." The matching degree is sometimes also referred to as a similarity degree. Furthermore, the result of comparison of the matching degree with the predetermined threshold is sometimes also referred to as a comparison result.

This concludes the description of the controller unit 11.

Description of Operation Screens

Figure 7:
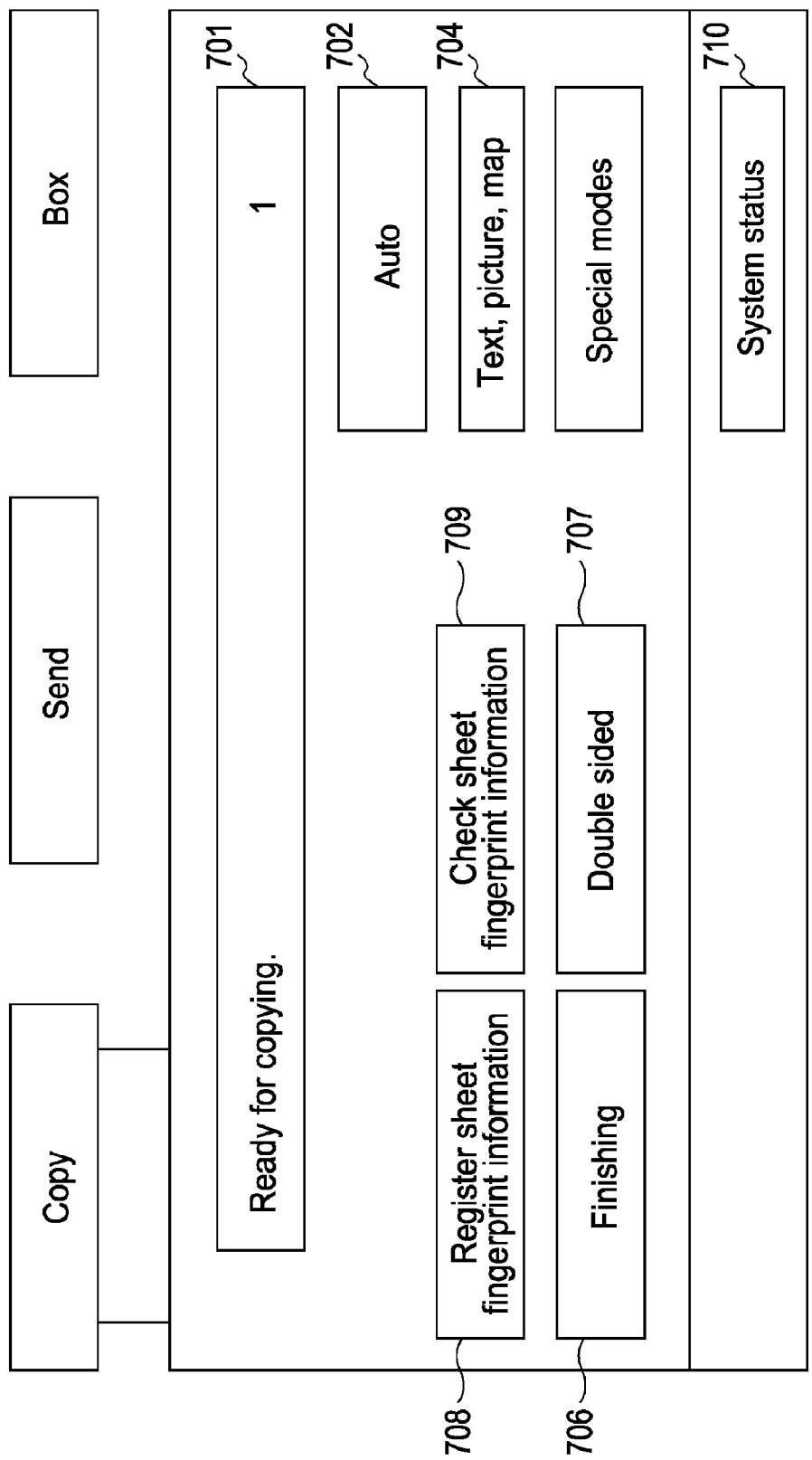
FIG. 7 is an illustration of a copying screen on an operating unit.

FIG. 7 shows an initial screen of the image forming apparatus 10. A region 701 indicates whether the image forming apparatus 10 is ready for copying and also indicates setting of a number of copies to print. An original-document selection button 704 is used to select a type of original document. When this button is pressed, a popup showing a menu of selection from three modes, namely, the text mode, the picture mode, and the text/picture mode, is displayed. A finishing button 706 is used to specify various setting relating to finishing. A double-side setting button 707 is used to specify setting regarding double-sided reading and double-sided printing. A reading-mode button 702 is used to select an original-document reading mode. When this button is pressed, a popup showing a menu of selection from three modes, namely, the color mode, the black mode, and the automatic (ACS) mode, is displayed. The color mode is selected for color copying, and the black mode is selected for monochrome copying. When the ACS mode is selected, the copying mode is determined according to the monochrome/color checking signal described earlier.

A sheet-fingerprint-information registration button 708 is a button for selecting a sheet-fingerprint-information registering process. The sheet-fingerprint-information registering process will be described later. A sheet-fingerprint-information comparison button 709 is a button for selecting a sheet-fingerprint-information comparing process. The sheet-fingerprint-information comparing process will be described later.

A system status button 710 is a button for showing the system status. When this button is pressed, a list of image data stored in the HDD 304 of the image forming apparatus 10 is displayed on the screen.

Operation Executed when the Button for the Sheet-Fingerprint-Information Registering Process is Pressed (the Sheet-Fingerprint-Information Registering Process at the Time of Copying)

Figure 16:
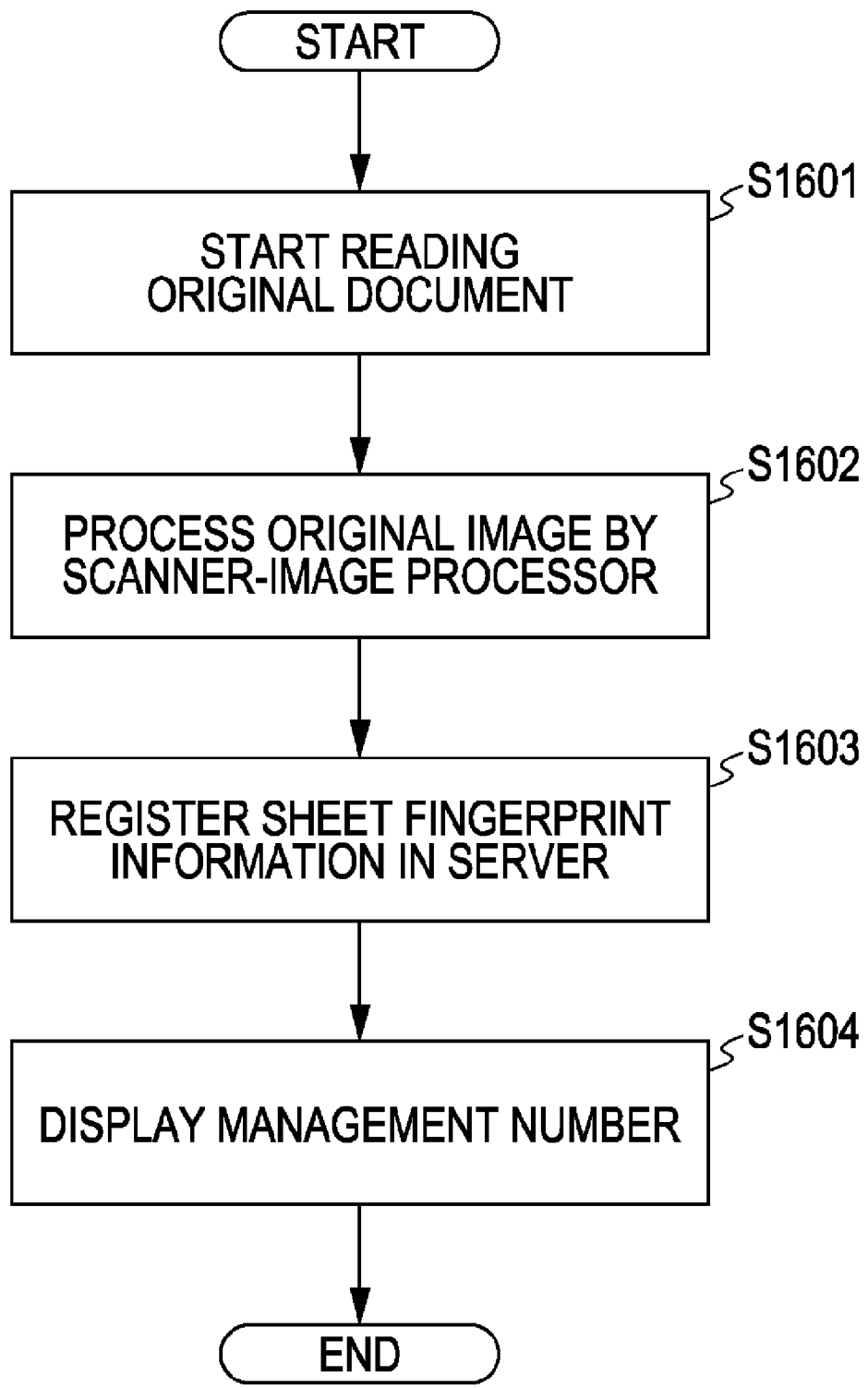
FIG. 16 is a flowchart of a process of registering sheet fingerprint information in a first exemplary embodiment of the present invention.

Next, the sheet-fingerprint-information registering process, which is executed when the sheet-fingerprint-information registration button 708 shown in FIG. 7 is pressed by a user and then a start key is pressed, will be described with reference to FIG. 16.

In step S1601, the CPU 301 exercises control so that image data representing an original document read by the scanner 13 is transferred to the scanner-image processor 312 via the scanner I/F 311.

In step S1602, the scanner-image processor 312 sets a gain adjustment value that is smaller than an ordinary gain adjustment value to the shading correction unit 500. Then, luminance values obtained by applying the small gain adjustment value to the image data are output to the sheet-fingerprint-information obtaining unit 507. Then, on the basis of the output data, the sheet-fingerprint-information obtaining unit 507 obtains sheet fingerprint information. The sheet fingerprint information obtained is transferred to the RAM 302 via a data bus (not shown).

In techniques for obtaining sheet fingerprint information, in order to obtain a fiber pattern from a white region, relatively dark image data is obtained. Thus, in this embodiment, the scanner-image processor 312 sets a gain adjustment value that is smaller than an ordinary gain adjustment value so that dark image data for obtaining sheet fingerprint information can be obtained. However, the method of obtaining dark image data is not limited to this method. For example, the amount of light may be reduced at the time of scanning.

In step S1603, the CPU 301 requests a server to issue a management number, and registers the sheet fingerprint information and information indicating the sheet-fingerprint-information obtaining area in association with the management number in the server. The information indicating the sheet-fingerprint-information obtaining area refers to position information indicating a position from which the sheet fingerprint information was obtained.

Figure 17:
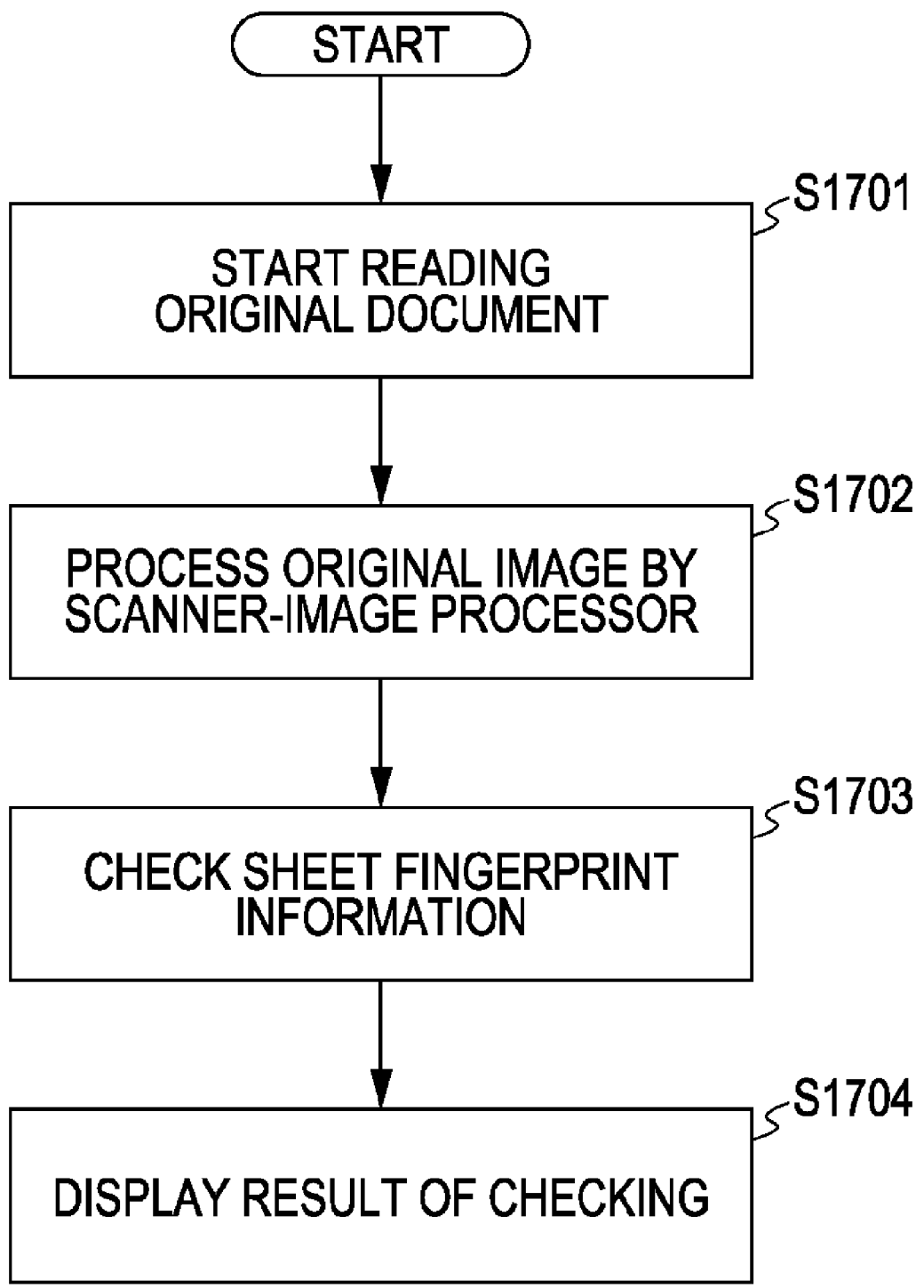
FIG. 17 is a flowchart of a process of comparing sheet fingerprint information in the first embodiment.

In step S1604, the CPU 301 exercises control so that the management number is displayed on the screen. Operation executed when the button for the sheet-fingerprint-information comparing process is pressed Next, an operation that is executed when the sheet-fingerprint-information comparison button 709 shown in FIG. 7 is pressed and then the start key is pressed after entering the management number will be described with reference to FIG. 17.

In step S1701, the CPU 301 exercises control so that image data representing an original document read by the scanner 13 is transferred to the scanner-image processor 312 via the scanner I/F 311.

In step S1702, the scanner-image processor 312 executes processing shown in FIG. 5 on the image data to generate new image data and property data. Furthermore, the scanner-image processor 312 attaches the property data to the image data.

Furthermore, in step S1702, the CPU 301 determines a sheet-fingerprint-information obtaining area on the basis of the input management number. Then, the sheet-fingerprint-information obtaining unit 507 in the scanner-image processor 312 obtains sheet fingerprint information from the sheet-fingerprint-information obtaining area determined as described above. Then, the sheet-fingerprint-information obtaining unit 507 sends the sheet fingerprint information to the RAM 302 via a data bus (not shown).

Furthermore, in step S1702, sheet fingerprint information registered in the server in association with the input management number is obtained. Then, the sheet fingerprint information is sent to the RAM 302 via a data bus (not shown).

In step S1703, the CPU 301 compares the sheet fingerprint information obtained via the sheet-fingerprint-information obtaining unit 507 with the sheet fingerprint information registered in the server. This comparison has been described earlier as the sheet-fingerprint-information comparing process with reference to FIG. 9.

In step S1704, the CPU 301 exercises control so that a result of the sheet-fingerprint-information comparing process (valid or invalid) is displayed on the display screen of the operating unit 12.

Sheet-Fingerprint-Information Registering Process at the Time of Printing (Executed by the Host Computer)

The method of obtaining sheet fingerprint information at the time of copying and registering the sheet fingerprint information in a server has been described above. Next, processing for obtaining sheet fingerprint information at the time of printing and registering the sheet fingerprint information will be described.

Figure 10:
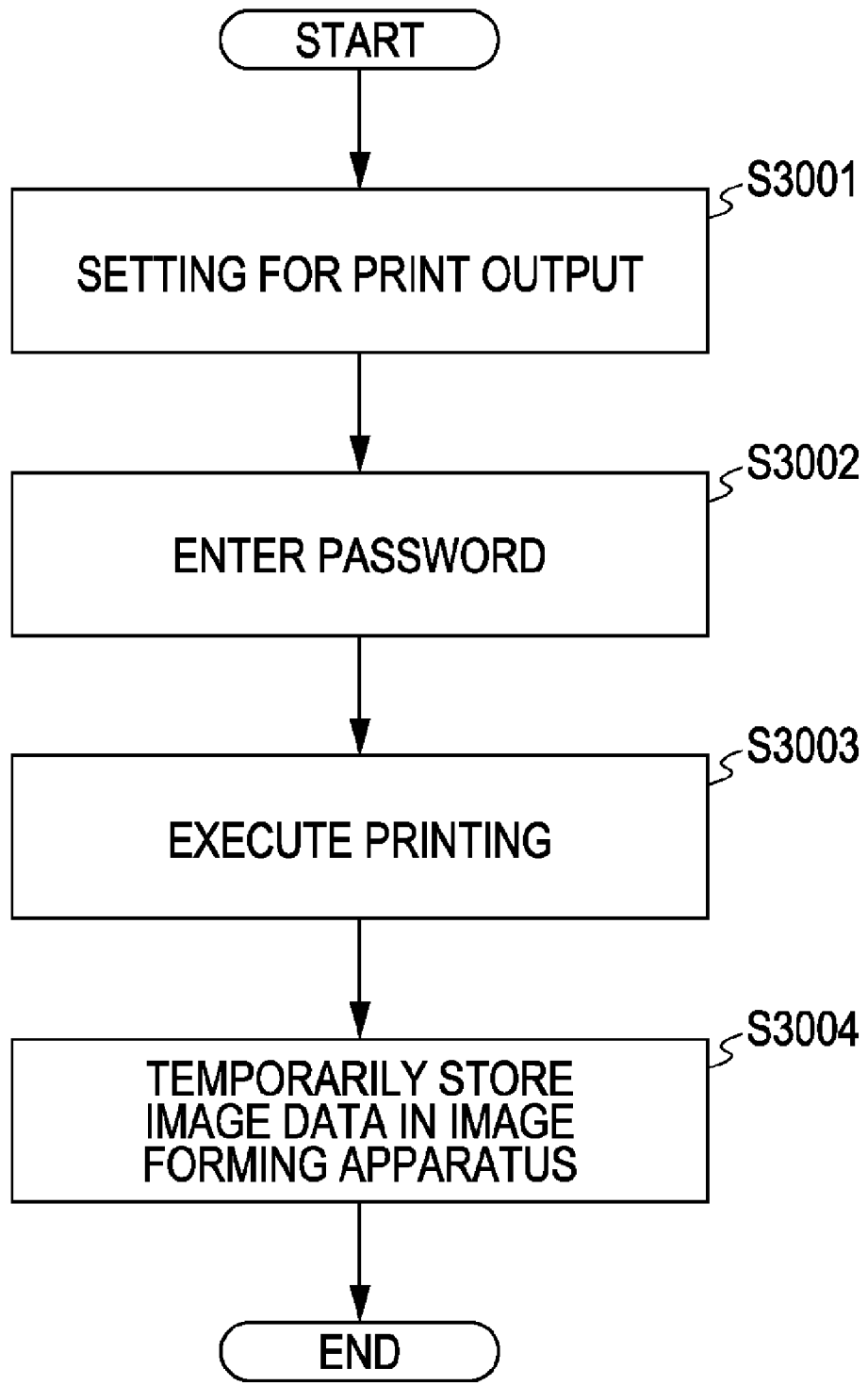
FIG. 10 is a flowchart of processing executed by a host computer in a sheet-fingerprint-information obtaining process at a time of printing.

Now, a flow of processing for issuing a print instruction from the host computer 40 to one of the image forming apparatuses 10, 20, and 30 via a printer driver will be described with reference to a flowchart shown in FIG. 10. Steps S3001 to S3003 in this flowchart are generally controlled by a CPU in the host computer 40. On the other hand, step S3004 is generally controlled by the CPU 301 of the image forming apparatus 10.

Figure 12:
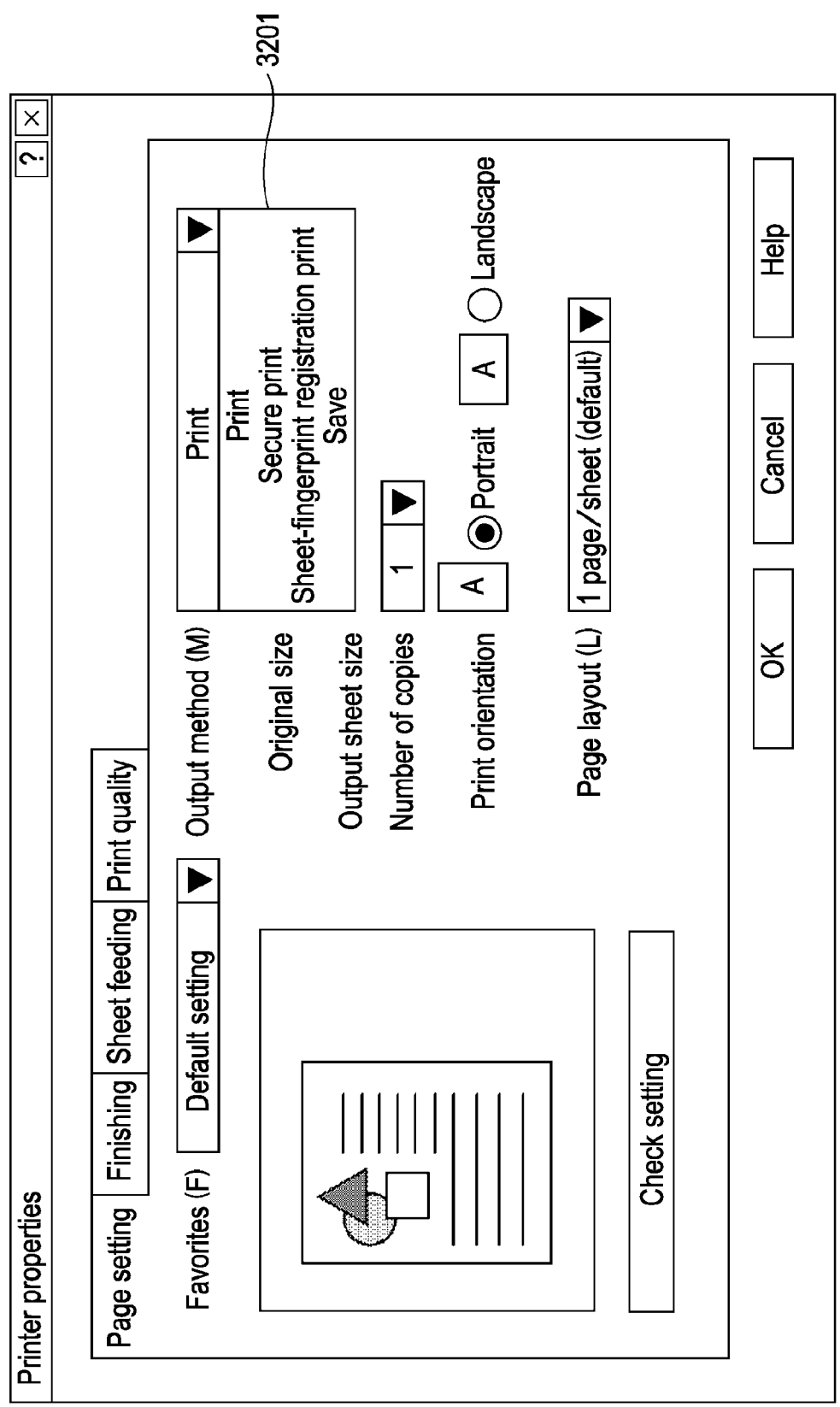
FIG. 12 is an illustration of a driver screen on the host computer in the sheet-fingerprint-information obtaining process at the time of printing.

In step S3001, a user specifies print setting on a printer driver of the host computer 40. FIG. 12 shows an example of a screen displayed for the printer driver. The user selects a desired output type from an output-type pull-down menu 3201. For example, when the user wishes ordinary printing, the user selects "Print." When the user wishes "sheet-fingerprint-registration print," the user selects "Sheet-fingerprint-registration print." It is assumed herein that "Sheet-fingerprint-registration print" is selected. After the user specifies an output type by the pull-down menu 3201 and clicks on an "OK" button, the CPU of the host computer 40 prompts the user to enter a password.

In step S3002, the CPU of the host computer 40 checks the password entered by the user. Then, the process proceeds to step S3003.

In step S3003, print data is sent together with the password to a specified image forming apparatus (e.g., the image forming apparatus 10).

In step S3004, the image forming apparatus 10 receives the print data, and analyzes the print data to generate intermediate data. Then, the image forming apparatus 10 generate image data on the basis of the intermediate data. Then, the image forming apparatus 10 exercises control so that the CPU 301 of the image forming apparatus 10 temporarily stores the image data in the HDD 304.

Sheet-Fingerprint-Information Registering Process at the Time of Printing (Executed by the Image Forming Apparatus)

Figure 11:
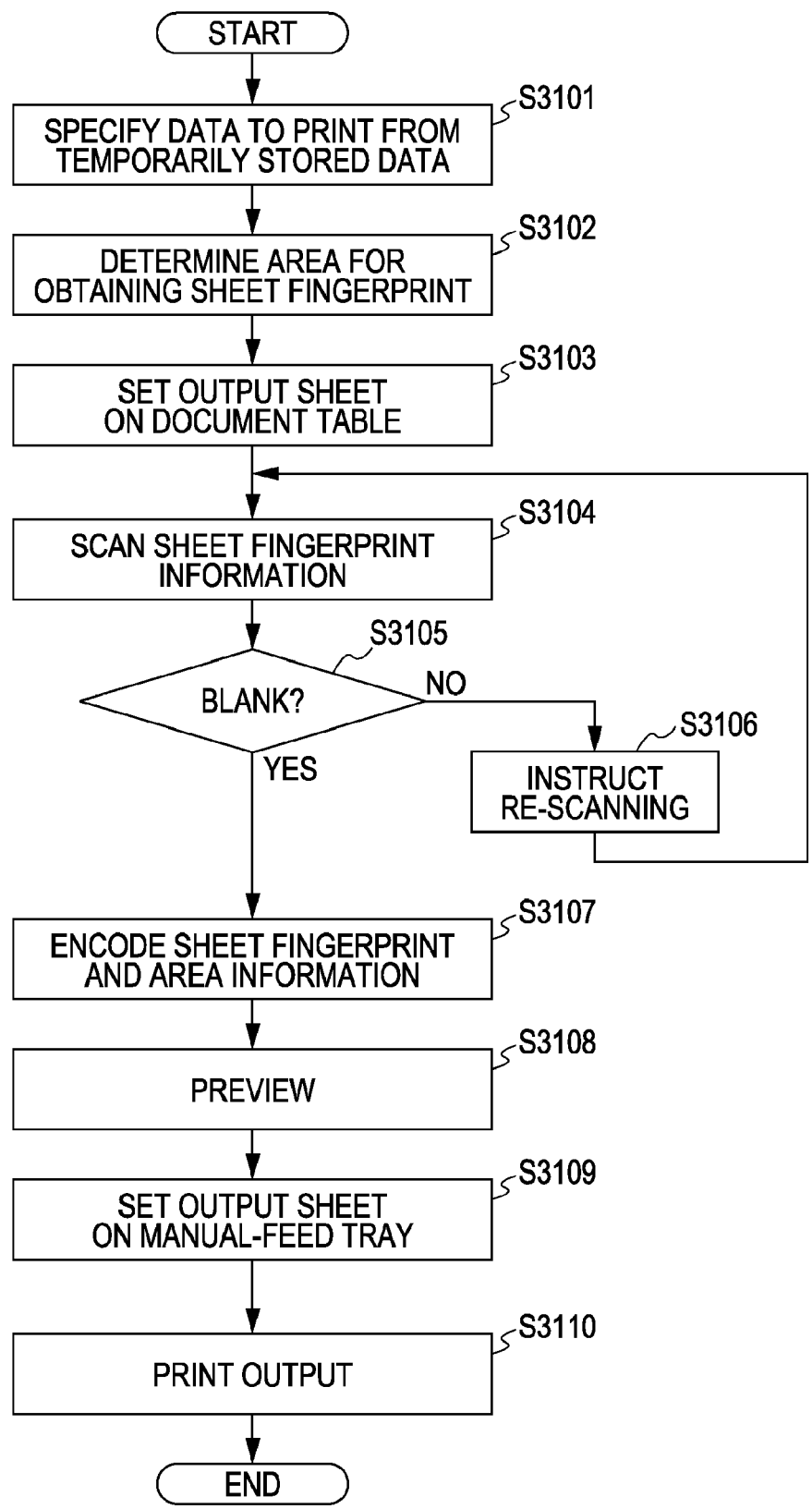
FIG. 11 is a flowchart of processing executed by the image forming apparatus in the sheet-fingerprint-information obtaining process at the time of printing.

Next, a process that is executed subsequently to the process of the flowchart shown in FIG. 10 will be described with reference to a flowchart shown in FIG. 11. The steps of the flowchart shown in FIG. 11 are generally controlled by the CPU 301 of the image forming apparatus.

First, in the operation screen shown in FIG. 7, the user presses the "System status" button 710. When the "System status" button 710 is pressed, the CPU 301 exercises control so that identification information (e.g., names) of all the image data temporarily stored is displayed on the display screen. The user specifies desired image data therefrom. Then, the CPU 301 requests input of a password. When a password is entered by the user in response to the request, the CPU 301 compares the input password with the password set in step S3001. When these passwords match, the CPU 301 identifies the image data desired by the user. The identification of the image data desired by the user is executed by the CPU 301 in step S3101.

Then, in step S3102, the CPU 301 determines an area from which sheet fingerprint information is to be obtained on the basis of the image data desired by the user. That is, the CPU 301 determines an appropriate area as a sheet-fingerprint-information obtaining area. A method of determining a sheet-fingerprint-information obtaining area will be described later with reference to FIGS. 13 and 15.

In step S3103, the CPU 301 displays a message saying "Please set a sheet for printing on the document table and scan the sheet." on the operating unit 12. In response, the user sets a sheet for a print output on the document table, and presses the "OK" key.

In step S3104, the scanner 13 scans the sheet on the document table. Furthermore, the scanner 13 sends the data obtained by scanning to the scanner-image processor 312 via the scanner I/F 311. The scanner-image processor 312 sets a gain adjustment value that is smaller than an ordinary gain adjustment value in the shading correction unit 500. With this setting, the scanner-image processor 312 applies the small gain adjustment value to the data obtained by scanning. Then, the resulting luminance signals are output to the sheet-fingerprint-information obtaining unit 507.

In step S3105, the CPU 301 checks whether the values of all the luminance signals are greater (brighter) than or equal to a predetermined value. In other words, the CPU 301 determines whether there are any values among the values of the luminance signals that are less than the predetermined value.

When there are any values in the values of the luminance signals that are less (darker) than the predetermined value, it is possible that the scanned sheet for printing is not blank (NO in step S3105). Thus, the CPU 301 exercises control so that an alert is displayed on the display screen. When the user instructs re-scanning in order to exchange sheets or for any other reason, the user instructs re-scanning in step S3106, so that step S3104 is executed again.

On the other hand, when it is determined in step S3105 that all the values of the luminance signals are greater (brighter) than or equal to the predetermined value, the scanned sheet for printing is blank (YES in step S3105), and the process proceeds to step S3107.

In step S3107, the CPU 301 requests a server to issue a management number, and exercises control so that the sheet fingerprint information and information indicating the sheet-fingerprint-information obtaining area are registered in the server in association with the management information.

In step S3108, the CPU 301 exercises control so that a message saying "Please set the scanned sheet on the manual-feed tray." is displayed on the display screen.

In response, the user removes the print sheet, for which the sheet fingerprint information has been obtained, from the document table, and sets the print sheet on the manual-feed tray in step S3109.

Then, in step S3110, an image corresponding to the image data is output on the sheet set on the manual-feed tray. When this process is completed, the CPU 301 exercises control so that the management number is displayed on the display screen.

Method of Determining a Sheet-Fingerprint-Information Obtaining Area

Figure 14:
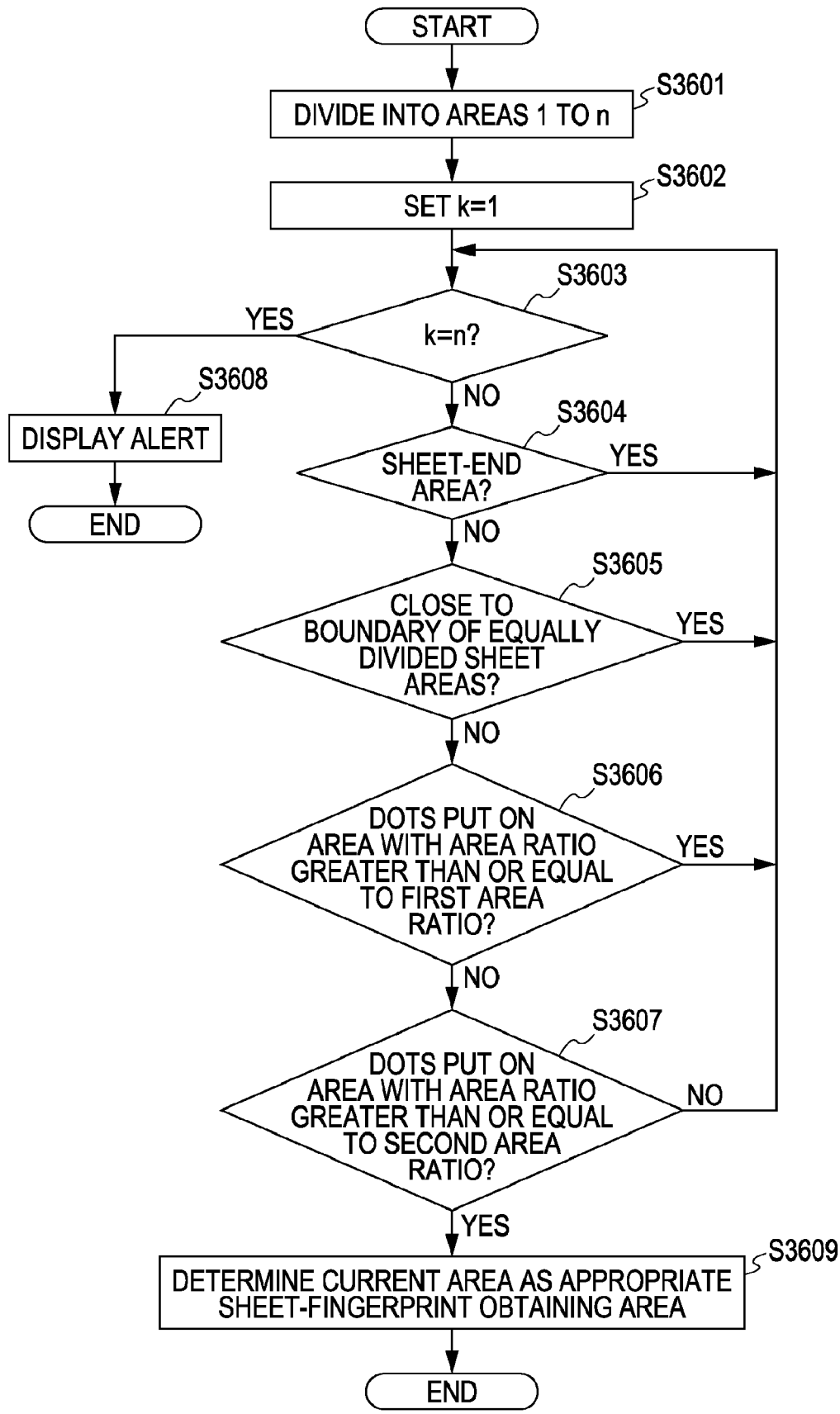
FIG. 14 is a flowchart of a process of determining a sheet-fingerprint-information obtaining area.

FIG. 14 is a flowchart of the method of determining a sheet-fingerprint-information obtaining area. The steps of this flowchart are generally controlled by the CPU 301. This flowchart shows a process of searching for an appropriate area for obtaining sheet fingerprint information and setting the appropriate area as a sheet-fingerprint-information obtaining area.

In step S3601, the CPU 301 exercises control so that the area on the sheet is divided into areas 1 to n. The divided areas all have the same size, which is appropriate as a size of a sheet-fingerprint-information obtaining area.

In step S3602, the CPU 301 sets k=1.

In step S3603, the CPU 301 checks whether k=n. When k=n (YES in step S3603), the process proceeds to step S3608. In step S3608, the CPU 301 exercises control so that a message indicating that determination of a sheet-fingerprint-information obtaining area has failed is displayed on the display screen.

When it is determined in step S3603 that k is not=n (NO in step S3603), the process proceeds to step S3604. In step S3604, a k-th area is set as a target area. Then, it is checked whether the target area is a sheet-end area (i.e., an area within a predetermined distance from a sheet end). When the target area is a sheet-end area (YES in step S3604), the process returns to step S3603. When the target area is not a sheet-end area (NO in step S3604), the process proceeds to step S3605.

In step S3605, it is checked whether the target area is an area close to a boundary that equally divides the sheet (an area within a predetermined distance from the boundary). More specifically, for example, an area within 1 cm of the boundary is defined as a close area. When the target area is an area close to the boundary (YES in step S3605), the process returns to step S3603. When the target area is not an area close to the boundary (NO in step S3605), the process proceeds to step S3606.

In step S3606, it is checked on the basis of the image data whether the target area is an area where dots were put on (or dots are to be put on) by an area ratio that is greater than or equal to a first predetermined area ratio (a relatively high area ratio). When it is determined that the target area is an area where dots were put on (or dots are to be put on) by an area ratio that is greater than or equal to the first predetermined area ratio (YES in step S3606), the process returns to step S3603. When it is determined that the target area is not an area where dots were put on (or dots are to be put on) by an area ratio that is greater than or equal to the first predetermined area ratio (NO in step S3606), the process proceeds to step S3607. This processing serves to exclude flat black areas.

As described earlier in the section of the related art, basically, a pattern of interwoven fibers is read in a region of white pixels. Thus, a flat black region is not suitable as a sheet-fingerprint-information obtaining area, so that flat black regions should be excluded.

In step S3607, it is checked on the basis of the image data whether the target area is an area where dots were put on (or dots are to be put on) by an area ratio that is greater than or equal to a second predetermined area ratio (a relatively low area ratio). When it is determined that the target area is not an area where dots were put on (or dots are to be put on) by an area ratio that is greater than or equal to the second predetermined area ratio (NO in step S3607), the process returns to step S3603. When it is determined that the target area is an area where dots were put on (or dots are to be put on) by an area ratio that is greater than or equal to the second predetermined area ratio (YES in step S3607), the process proceeds to step S3609. This processing serves to exclude white regions.

This processing is executed since a white region is likely to be cut out and attached to another sheet, so that a white region is not suitable as a sheet-fingerprint-information obtaining area.

In step S3609, an area determined through the previous steps is determined as an appropriate sheet-fingerprint-information obtaining area.

Lastly, a method of obtaining an area ratio of an area where dots were put on (or dots are to be put on) on the basis of image data will be described.

First, the average density of a target area is defined as ("the range of luminance values"−"the luminance values of the individual pixels in the target area")×"the number of pixels included in the target area." When it is only possible to obtain luminance values of one color (Y of YUV) as luminance values of the individual pixels in the target area, the "range of luminance values" is, for example, 255. When luminance values of the three colors (all of RGB) of the individual pixels in the target area are available, the "range of luminance values" is, for example, 255×3.

Then, in steps S3606 and S3607, the value of the average density is compared with the first predetermined area ratio and the second predetermined area ratio. The values of the area ratios and the average density are converted into values in the same unit for the purpose of comparison.

Example of a Sheet-Fingerprint-Information Obtaining Area

Figure 15:
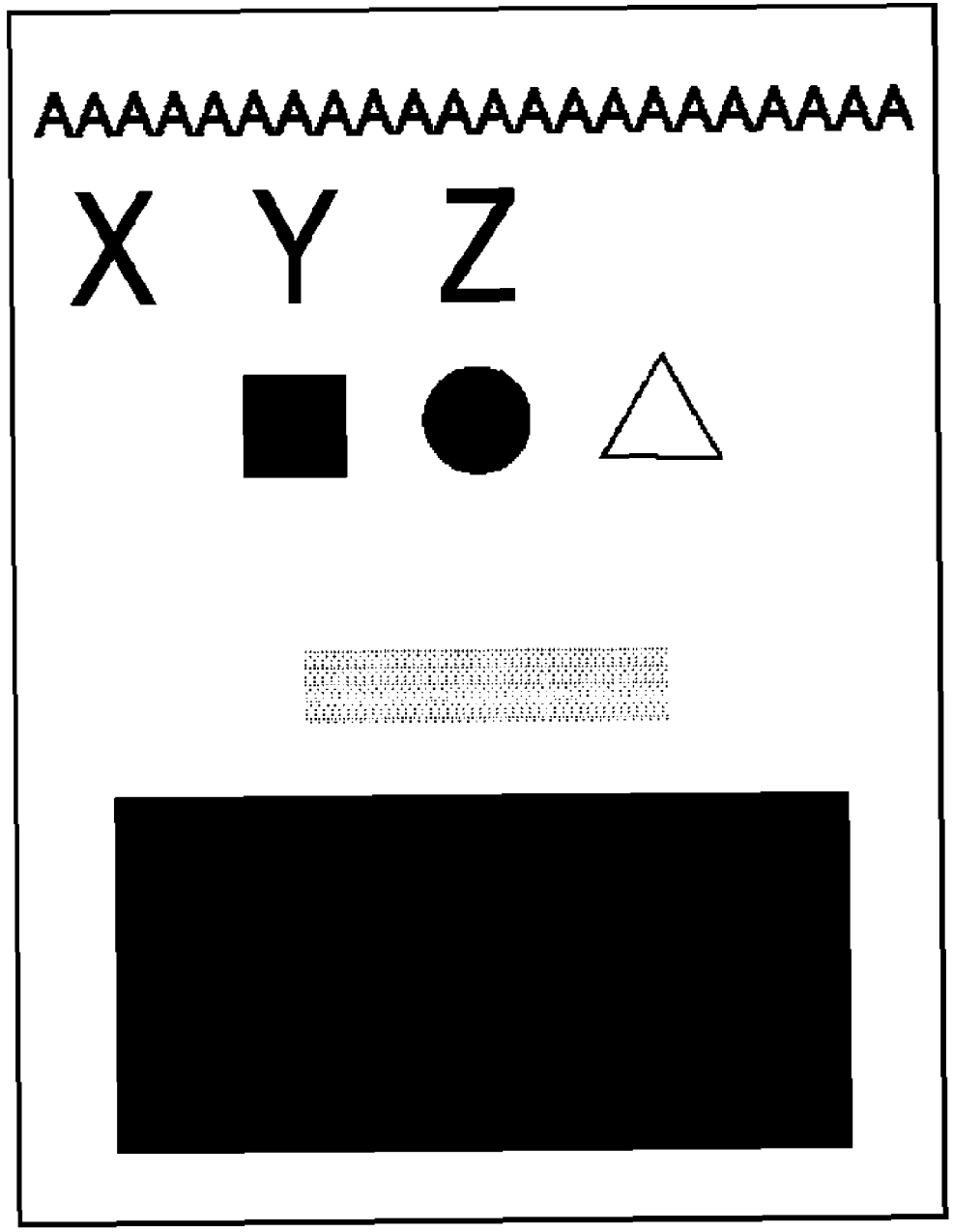
FIG. 15 is a diagram showing image data for explaining the sheet-fingerprint-information obtaining area shown in FIG. 13.

Suppose that the image data temporarily stored in the HDD is image data shown in FIG. 15.

When sheet fingerprint information is obtained from a certain area but the certain area is a flat black area according to the image data, the matching degree becomes low at the time of comparison. Thus, it is not suitable to use a flat black area as a sheet-fingerprint-obtaining area.

Thus, on the basis of the image data desired by the user, the CPU 301 specifies each area where dots are to be put on by an area ratio greater than or equal to the first area ratio as a sheet-fingerprint-information obtaining-prohibition area.

Furthermore, the CPU 301 specifies each area corresponding to a sheet-end area of an output sheet as a sheet-fingerprint-information obtaining-prohibition area. This is because an area corresponding to a sheet-end area of an output sheet is often cut out. When a sheet-fingerprint-information obtaining area is cut out and attached to another sheet, the sheet-fingerprint-information obtaining area is defined on the another sheet.

Furthermore, the CPU 301 specifies each area close to a boundary that equally divides the output sheet as a sheet-fingerprint-information obtaining-prohibition area. This is because the user is likely to fold the output sheet at the middle of the output sheet. When the output sheet is folded, the matching degree becomes lower, so that an incorrect determination could occur.

The CPU 301 specifies these four types of areas as sheet-fingerprint-information obtaining-prohibition areas.

Among areas other than the areas specified as described above, an area where dots are to be put on by an area ratio less than a predetermined area ratio is determined as a sheet-fingerprint-information obtaining area.

Figure 13:
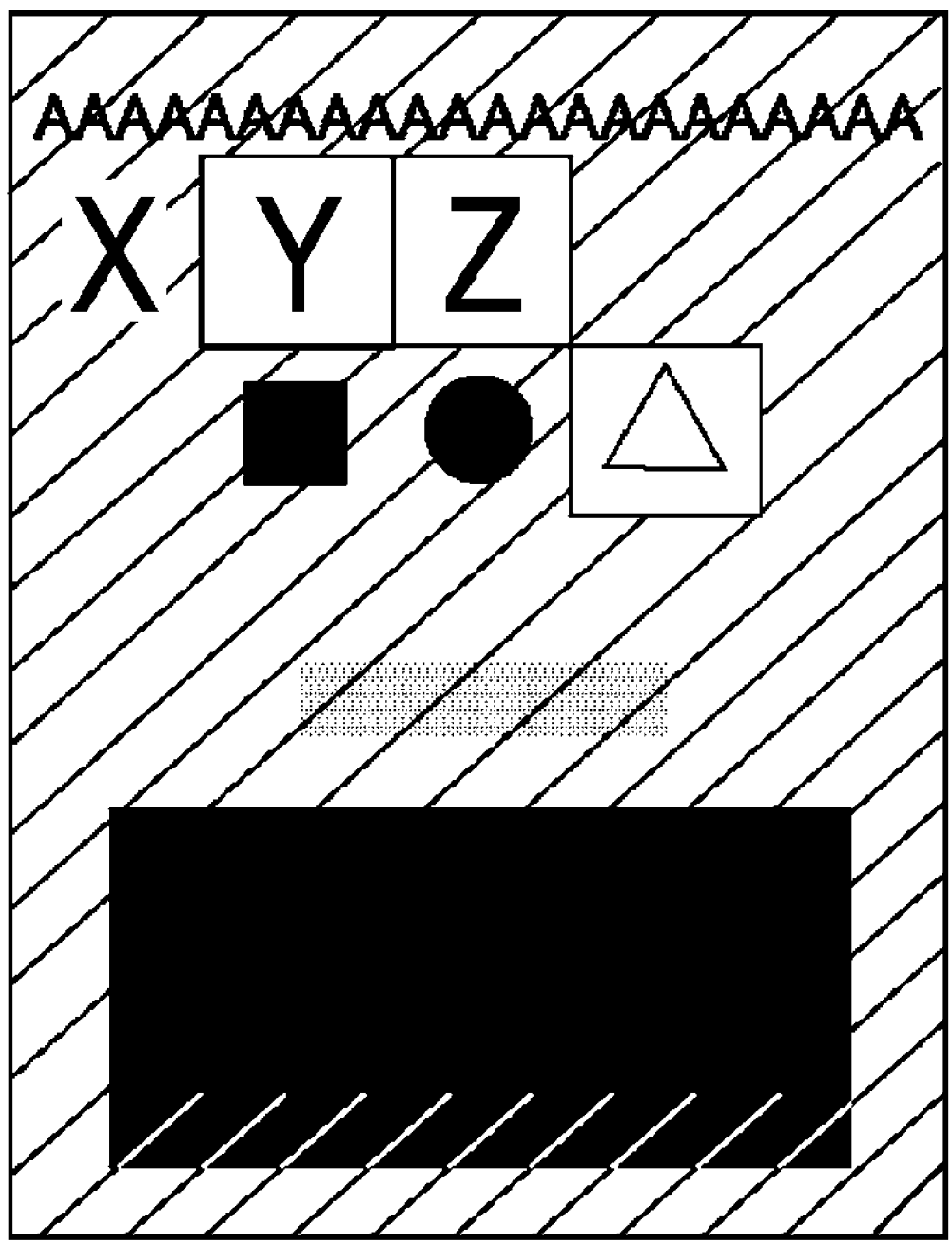
FIG. 13 is a diagram showing a sheet-fingerprint-information obtaining area.

Assuming that the image data temporarily stored in the HDD is image data shown in FIG. 13, referring to FIG. 15, a hatched area and a flat black area at the bottom are specified as sheet-fingerprint-information obtaining-prohibition areas. The other areas serve as candidates of a sheet-fingerprint-information obtaining area.

In the example described above, it is assumed that the output sheet is folded into two parts, so that an area close to a boundary that equally divides the sheet is specified as a sheet-fingerprint-information obtaining-prohibition area. However, a sheet-fingerprint-information obtaining-prohibition area may be determined in accordance with the size of an output sheet. For example, in the case of an A3 output sheet, it is possible to determine a sheet-fingerprint-information obtaining-prohibition area assuming that the sheet will be folded into four parts.

Furthermore, it is possible to determine sheet-fingerprint-information obtaining-prohibition area on the basis of a sheet type. For example, since it is usually difficult to fold cardboard into two parts, it is possible not to specify an area close to a boundary as a sheet-fingerprint-information obtaining-prohibition area.

As described above, according to the first embodiment, input image data is divided into a plurality of areas (1 to n), and the areas formed by division are sequentially searched, starting with the area 1, for an area satisfying the following conditions. When an area satisfying the conditions is found, the area is determined as a sheet-fingerprint-information obtaining area.

The conditions can be summarized as follows:
Condition 1: The area is not a sheet-end area.
Condition 2: The area is not an area close to a boundary.
Condition 3: The area is not a flat white area.
Condition 4: The area is not a flat black area.

In order to execute the processing quickly, processing involving the conditions 3 and 4, which is intensive since it is needed to determine the ratio of an area where dots are to be put on, are executed in later steps, and processing involving the conditions 1 and 2, which are not intensive, are executed in earlier steps.

Upon finding any area satisfying all these conditions, the process of determining a sheet-fingerprint-information obtaining area is finished.

Second Embodiment

According to the first exemplary embodiment, however, when an area satisfying all the conditions is not found until reaching an area encountered at a rather late occasion (e.g., the (n−1)-th area or the n-th area), the processing takes a long time.

In contrast, according to a second exemplary embodiment of the present invention, a user is allowed to select a desired area, and it is checked whether the desired area satisfies all the conditions. When the area satisfies all the conditions, the process of determining a sheet-fingerprint-information obtaining area is finished.

By allowing a user to select a desired area from the beginning as described above, it is possible to reduce the time taken to find an area satisfying all the conditions.

Furthermore, it is possible to obtain sheet fingerprint information from the area desired by the user.

Figure 18:
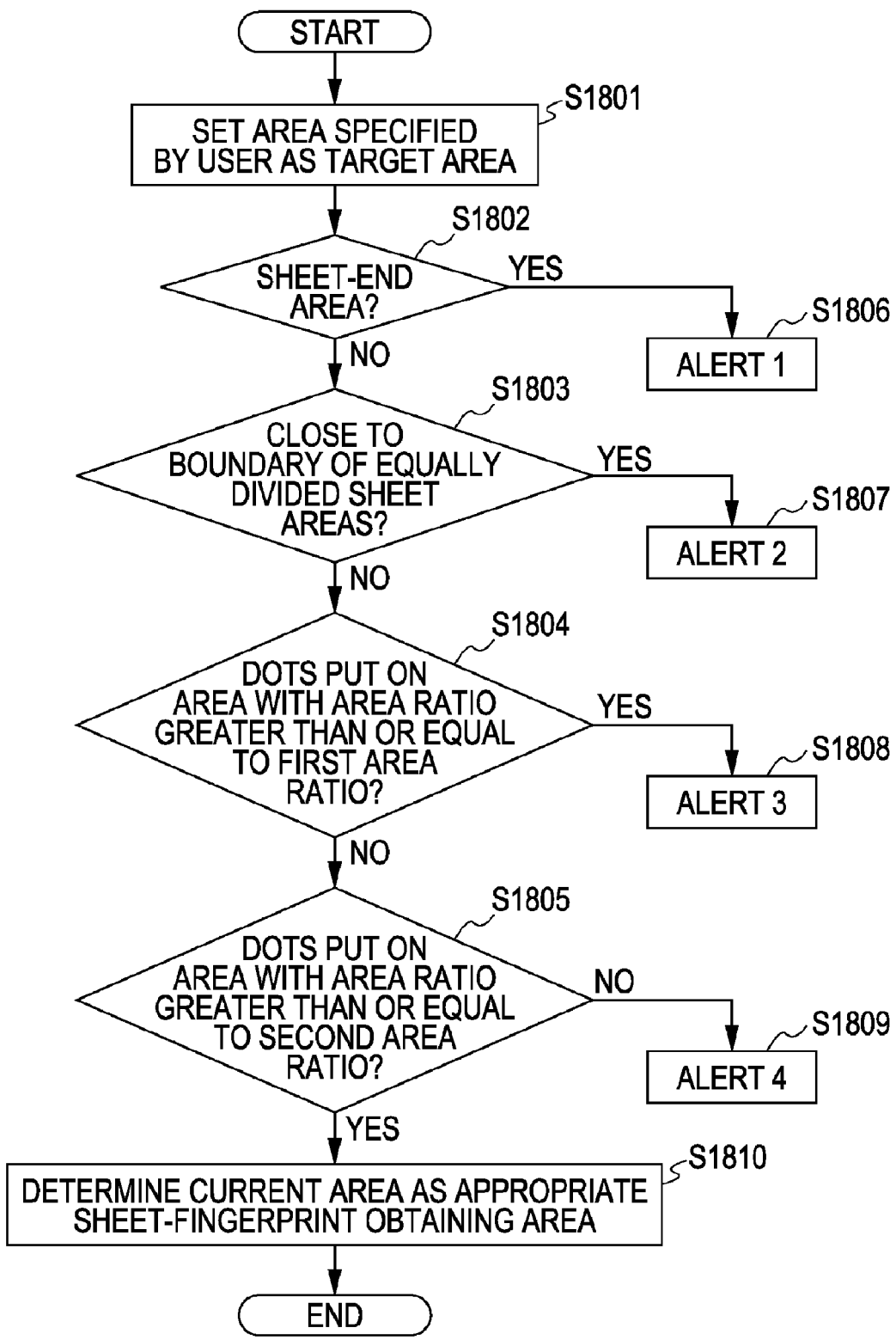
FIG. 18 is a flowchart of a process of determining a sheet-fingerprint-information obtaining area in a second exemplary embodiment of the present invention.

FIG. 18 shows a flowchart of the process of determining a sheet-fingerprint-information obtaining area in the second embodiment.

The steps of this flowchart are generally controlled by the CPU 301.

In step S1801, the CPU 301 displays an image corresponding to the image data on the display screen of the operating unit 12. Furthermore, the CPU 301 displays a message to prompt the user to select a desired sheet-fingerprint-information obtaining area from the image. When the user selects a desired area in response, the CPU 301 sets the selected area as a target area.

In step S1802, it is checked whether the target area is a sheet-end area. When it is determined that the target area is not a sheet-end area, the process proceeds to step S1803. When it is determined that the target area is a sheet-end area, the process proceeds to step S1806 (alert 1).

In step S1803, it is checked whether the target area is an area close to a boundary that equally divides the sheet. When the target area is not an area close to the boundary, the process proceeds to step S1804. When the target area is an area close to the boundary, the process proceeds to step S1807 (alert 2).

In step S1804, it is checked on the basis of the image data whether the target area is an area where dots were put on (or dots are to be put on) by an area ratio that is greater than or equal to a first predetermined area ratio (a relatively high area ratio). When it is determined that the target area is not an area where dots were put on (or dots are to be put on) by an area ratio that is greater than or equal to the first predetermined area ratio (NO in step S1804), the process proceeds to step S1805. Otherwise, the process proceeds to step S1808 (alert 3). This processing serves to exclude flat black areas.

As described earlier in the section of the related art, basically, a pattern of interwoven fibers is read in a region of white pixels. Thus, a flat black region is not suitable as a sheet-fingerprint-information obtaining area, so that flat black regions should be excluded.

In step S1805, it is checked on the basis of the image data whether the target area is an area where dots were put on (or dots are to be put on) by an area ratio that is greater than or equal to a second predetermined area ratio (a relatively low area ratio). When it is determined that the target area is an area where dots were put on (or dots are to be put on) by an area ratio that is greater than or equal to the second predetermined area ratio (YES in step S1805), the process proceeds to step S1810. Otherwise, the process proceeds to step S1809 (alert 4). This processing serves to exclude white areas.

As described earlier in the section of the related art, a white area is likely to be cut out and attached to another sheet. Thus, it is not suitable to use a white area as a sheet-fingerprint-information obtaining area.

In step S1810, the area specified by the user is determined as an appropriate sheet-fingerprint-information obtaining area.

In step S1806, the CPU 301 exercises control to ask the user to select an area closer to the center via the display screen.

In step S1807, the CPU 301 exercises control to ask the user to select an area closer to a sheet end via the display screen.

In step S1808, the CPU 301 exercises control to ask the user to select a whiter area via the display screen.

In step S1809, the CPU 301 exercises control to ask the user to select a blacker area via the display screen.

When the user selects a new area in response to any of the messages in steps S1806 to S1809, the process returns to step S1801.

When the user selects "Select an area automatically" in response to any of the messages in steps S1806 to S1809, the process shown in FIG. 18 is exited, and the process shown in FIG. 14 is started. That is, the process described in the context of the first embodiment is used.

Although the user is allowed to select a sheet-fingerprint-information obtaining area freely in step S1801 in this embodiment, alternatively, the following restrictions (1) and (2) may be imposed on the selection of a sheet-fingerprint-information obtaining area by the user:

(1) Sheet-end areas are grayed out to prohibit selection.

(2) Areas close to a boundary are grayed out to prohibit selection.

In this case, steps S1802 and S1803 can be omitted from the flowchart shown in FIG. 18. This serves to improve the speed of processing.

Furthermore, in step S1801, it is possible to display a message on the display screen asking the user to select an area that is not too black or too white.

Other Embodiments

The present invention can be applied to either a system composed of a plurality of apparatuses (e.g., a computer, an interface device, a reader, a printer, and so forth), or a standalone apparatus (a multifunction apparatus, a printer, a facsimile machine, or the like).

Furthermore, it is possible to implement the present invention by allowing a computer to read and execute program code stored on a storage medium, the program code representing the procedures in the flowcharts described above in the context of the embodiments. In this case, the functions of the embodiments are embodied by the program code read from the storage medium.

The storage medium for supply the program code may be, for example, a floppy disk, a hard disk, an optical disk, a magneto-optical disk, a CD-ROM, a CD-R, a magnetic tape, a non-volatile memory card, or a ROM.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2006-203373 filed Jul. 26, 2006, which is hereby incorporated by reference herein in its entirety.

What is claimed is:

1. A method of controlling an image processing apparatus, the method comprising:

dividing input image data into a plurality of areas;

checking whether each of the plurality of areas formed by dividing input image data is an area having a distance greater than or equal to a first distance from an end of a sheet on which the image data is to be printed;

checking whether each area determined as having a distance greater than or equal to the first distance is an area having a distance greater than or equal to a second distance from a boundary that equally divides the sheet on which the image data is to be printed;

checking whether each area determined as having a distance greater than or equal to the second distance is an area where dots are to be put on by an area ratio that is greater than a second area ratio and less than a first area ratio; and obtaining sheet fingerprint information from an area determined as an area where dots are to be put on by an area ratio that is greater than the second area ratio and less than the first area ratio;

wherein the first distance is determined according to a type of the sheet on which the image data is to be printed.

2. A non-transitory computer-readable storage medium storing a program for causing a computer to execute steps comprising:

dividing input image data into a plurality of areas;

checking whether each of the plurality of areas formed by dividing input image data is an area having a distance greater than or equal to a first distance from an end of a sheet on which the image data is to be printed;

checking whether each area determined as having a distance greater than or equal to the first distance is an area having a distance greater than or equal to a second distance from a boundary that equally divides the sheet on which the image data is to be printed;

checking whether each area determined as having a distance greater than or equal to the second distance is an area where dots are to be put on by an area ratio that is greater than a second area ratio and less than a first area ratio; and obtaining sheet fingerprint information from an area determined as an area where dots are to be put on by an area ratio that is greater than the second area ratio and less than the first area ratio.

3. An image processing apparatus, comprising:

a finding unit configured to (1) divide input image data into a plurality of areas; (2) check whether each of the plurality of areas is an area having a distance greater than or equal to a first distance from an end of a sheet on which the image data is to be printed; (3) check whether each area determined as having a distance greater than or equal to the first distance is an area having a distance greater than or equal to a second distance from a boundary that equally divides the sheet on which the image data is to be printed; and (4) check whether each area determined as having a distance greater than or equal to the second distance is an area where dots are to be put on by an area ratio that is greater than a second area ratio and less than a first area ratio; and an obtaining unit configured to obtain sheet fingerprint information from an area determined as an area where dots are to be put on by an area ratio that is greater than the second area ratio and less than the first area ratio.

* * * * *